United States Patent
Lin et al.

(10) Patent No.: US 7,724,409 B2
(45) Date of Patent: May 25, 2010

(54) SYSTEM AND METHOD FOR RECORDING AND REPRODUCING HOLOGRAPHIC INTERFEROGRAM WITH OPTICAL SERVO

(75) Inventors: Chih-Ming Lin, Hsinchu (TW); Yung-Sung Lan, Hsinchu (TW); Chen-I Kuo, Hsinchu (TW); Tzuan-Ren Jeng, Hsinchu (TW); Feng-Hsiang Lo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 689 days.

(21) Appl. No.: 11/512,170

(22) Filed: Aug. 30, 2006

(65) Prior Publication Data

US 2007/0153344 A1 Jul. 5, 2007

(30) Foreign Application Priority Data

Dec. 30, 2005 (TW) .............................. 94147743 A

(51) Int. Cl.
*G03H 1/26* (2006.01)

(52) U.S. Cl. ............................. 359/22; 359/32; 359/35; 369/44.25; 369/103

(58) Field of Classification Search ........................ None
See application file for complete search history.

(56) References Cited

U.S. PATENT DOCUMENTS

| 6,721,076 B2 | 4/2004 | King et al. |
| 6,909,529 B2 | 6/2005 | Curtis |
| 2003/0025955 A1 | 2/2003 | Curtis |
| 2003/0039001 A1 | 2/2003 | King et al. |
| 2004/0103136 A1 | 5/2004 | Harding |
| 2004/0184382 A1 | 9/2004 | Horimai et al. |
| 2004/0212859 A1 | 10/2004 | Tsukagoshi |
| 2006/0114536 A1* | 6/2006 | Uno et al. ..................... 359/24 |
| 2006/0114792 A1* | 6/2006 | Uno et al. .................... 369/103 |
| 2006/0176532 A1* | 8/2006 | Toishi ......................... 359/24 |

FOREIGN PATENT DOCUMENTS

TW     464794     11/2001

OTHER PUBLICATIONS

Anderson et al, High Speed Holographic data storage at 100 Gbit/in$^2$, ThE$^2$, 2005 Optical Society of America, 3 pages.

* cited by examiner

*Primary Examiner*—Stephone B Allen
*Assistant Examiner*—Derek S Chapel
(74) *Attorney, Agent, or Firm*—Rabin & Berdo, P.C.

(57) ABSTRACT

A system and method for recording and reproducing holographic interferogram with servos. A servo process is provided by the system and method to continuously record a holographic interferogram in a holographic recording medium with servo trace layers. Also, by the servo process, the intensity distribution of a reference beam is monitored, which is reflected by a reflecting mirror disposed on the other side of the holographic recording medium. By analyzing the distribution, one can adjust the distance and the incidence angle between the reflection mirror and the reference beam. Moreover, a plurality of servo tracks on different layers are provided for recording the holographic interferogram on different layers of holographic recording medium.

26 Claims, 31 Drawing Sheets

SYSTEM AND METHOD FOR RECORDING AND REPRODUCING HOLOGRAPHIC INTERFEROGRAM WITH OPTICAL SERVO

CROSS-REFERENCE TO RELATED APPLICATIONS

This non-provisional application claims priority under 35 U.S.C. §119(a) on Patent Application No(s). 094147743 filed in Taiwan, R.O.C. on Dec. 30, 2005, the entire contents of which are hereby incorporated by reference.

BACKGROUND OF THE INVENTION

1. Field of Invention

The present invention relates to a system and method for recording and reproducing holographic storage, and more particularly, to a system and method which has an optical servo.

2. Related Art

Today, the storage capacity of commercial blue-ray disks rarely exceeds 100 GBytes, and various approaches to achieve super-high storage capacity have been widely researched and developed. The holographic disk is the most important approach of all. The holographic storage technology has been developed for long time. However, many factors make it difficult to be applied to commercial optical storage products. For example, in the early days holographic experiments had to employ a large laser source with high power of several hundreds of milliwatts, and a complex optical servomechanism, and a large and heavy anti-vibration system. Meanwhile, photo-refractive crystals serving as holographic storage media are too expensive, so that the development of holographic storage is limited. Presently, miniaturized high-power laser sources, high-photosensibility materials, and miniaturized optical servomechanism have been developed significantly. Also, inspired by the track-at-once optical disks, such as CD-R and DVD-R, it has gradually become a common view that holographic storage is not necessarily to be rewritable. Many organic materials that are cheap and have high photosensibility are used as the data layer of holographic storage media, such as photopolymer. When the photopolymer suffers a light irradiation with high intensity, the molecular arrangement of the photopolymer is changed to change the optical characteristics of the photopolymer, such that the photopolymer can be used to record and reproduce three-dimensional holographic interferograms. The miniaturized optical servomechanism derived from the CD or DVD players is also vital to the application of holographic storage technology.

Holographic storage technology, for example, Joint International Symposium on Optical Memory and Optical Data Storage 2005 (ISOM/ODS 2005), Hawaii, US, paper ThE2 discloses a transmissive holographic storage media for data storage. The approach of the paper include a two-dimensional image sensor and a spatial light modulator disposed on the same side of a holographic storage media, and a reflecting mirror set disposed on the other side of the holographic storage media. When reproducing data, a reproducing reference beam is reflected by the reflecting mirror set, and travels in a direction which is opposite the direction of the recording reference beam. Thus, the reproducing reference beam is projected to the holographic storage media. However, to a continuously moving holographic storage media, it is very difficult to adjust the position and the direction of the reflecting mirror set on time.

Other related art is disclosed in U.S. Pat. No. 6,721,076 and U.S. Pat. No. 6,909,529. They put forward a mechanism for a reflective holographic storage media, but they also failed to provide optical servomechanism for a continuously moving holographic storage media.

US Patent Publication No. 20040212859 discloses a recording method for transmissive holographic storage media. The method includes a two-dimensional image sensor and a spatial light modulator disposed on different sides of the holographic storage media. A servo beam is projected to the servo tracks of the holographic storage media via the objective lens. But the holographic interferogram is recorded only on a single layer, so the capacity of storage is limited.

SUMMARY OF THE INVENTION

In view of the above problems, the object of the present invention is to provide a system and method for recording and reproducing holographic storage with an optical servo. With the optical servo and the optical mechanism corresponding thereto, the holographic interferogram can be recorded and reproduced at different layers on a holographic storage media.

In order to achieve the above-mentioned object, a system for recording and reproducing holographic storage with optical servo is provided, which generates a signal beam and a reference beam by a light source. The reference beam is projected to a transmissive holographic recording medium in a first incidence direction. A spatial light modulator is located on the path in which the signal beam travels. The signal beam is projected to the spatial light modulator, and then projected to the holographic recording medium in a second incidence direction. The signal beam and the reference beam interfere with each other, generating a holographic interferogram in the holographic storage media. When the reference beam is projected to the holographic interferogram in the holographic storage media in the first incidence direction again, a reproduced beam is generated. The reproduced beam is projected to the two-dimensional spatial image sensor in the path of the signal.

In addition, the system further includes a servo beam guiding portion, with an optical servo light source for generating a servo beam. The servo beam is projected to servo tracks of the holographic storage media through the servo beam guiding portion. Then the servo beam is reflected by the servo tracks and received by a sensing portion, such that the reference beam is adjusted to be projected to the holographic storage media in the first incidence direction, and to continuously record a plurality of holographic interferograms in the holographic storage media along the servo tracks. Furthermore, the reference beam passes through the holographic storage media and is guided to the sensing portion after being reflected by a reflecting mirror on the other side of the holographic storage media, such that the distance and incident angle between the reflecting mirror and the reference beam are analyzed and adjusted.

Furthermore, the present invention provides an optical mechanism, which includes a light source for generating a signal beam and a reference beam. The reference beam is projected to the holographic storage media in a second incidence direction. An objective lens set is located on the path of the signal beam, to make the signal beam projected to the holographic storage media. A spatial light modulator is located on the path of the signal beam to make the signal beam projected to the holographic storage media and interfered with the reference beam after it is projected to the spatial light modulator, thus a holographic interferogram is generated in the holographic storage media. When the reference beam is projected to the holographic interferogram again in the second incidence direction, a reproducing beam is generated, and passes through the holographic storage media, and then is projected to the image sensor.

A servo light source is further provided to generate a servo beam. The servo beam is guided by being projected to the servo tracks of the holographic storage media through the servo beam guiding portion. The servo beam reflected by the servo tracks is then received by a sensing portion, such that a plurality of holographic interferogram is continuously recorded in the holographic storage media along the servo tracks. The servo tracks are formed in the holographic storage media in layers, such that the holographic interferogram is generated in the holographic storage media in different layers.

Moreover, for the reflective holographic storage media, a light source is provided for generating a signal beam and a reference beam. The reference beam is projected to the holographic storage media in the second incidence direction. An objective lens set is located on the path of the signal beam to make the signal beam projected to the holographic storage media. A spatial light modulator is located on the path of the signal beam to make the signal beam interfere with the reference beam after the signal beam is projected to the holographic storage media in a first incidence angle. Then, a holographic interferogram is generated in the holographic storage media. When the reference beam is projected to the holographic interferogram in the second interference direction, a reproducing beam is generated. The reproducing beam is reflected by the holographic storage media and is projected to an image sensor. A servo beam is generated by the servo light source, and then is guided to be projected to the servo tracks of the holographic storage media through the servo beam guiding portion. The servo tracks reflect the servo beam to be received by a sensing portion, such that a plurality of holographic interferograms is continuously recorded in the holographic storage media along the servo tracks. The servo tracks are formed in the holographic storage media in layers, such that the holographic interferogram is generated in the holographic storage media in different layers.

The present invention also provides a method for recording and reproducing holographic storage with optical servo. First, a servo beam is generated, and then is refracted. The servo beam is then projected to the servo tracks of the servo layers of the holographic storage media, and then is reflected. The servo beam reflected is received by a sensing portion, for being analyzed and adjusted, such that the servo beam focuses on the servo tracks of the holographic storage media, and continuously moves along the servo tracks. Meanwhile, data addresses and data on the servo tracks are decoded by the servo beam. When the servo beam is projected to a predetermined data address, a reference beam is projected to the holographic storage media in a first incidence direction, and a signal beam is projected to the holographic storage media. The signal beam and the reference beam interfere with each other, and thus a holographic interferogram is generated. Then, a plurality of holographic interferograms are continuously generated and recorded along servo tracks in the holographic storage medium. The servo tracks form layers in the holographic storage medium. The holographic interferograms can be generated and recorded in different layers of the holographic storage medium by focusing the servo beam on different layers.

Features and embodiments of the present invention are illustrated in detail below with reference to the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 2:
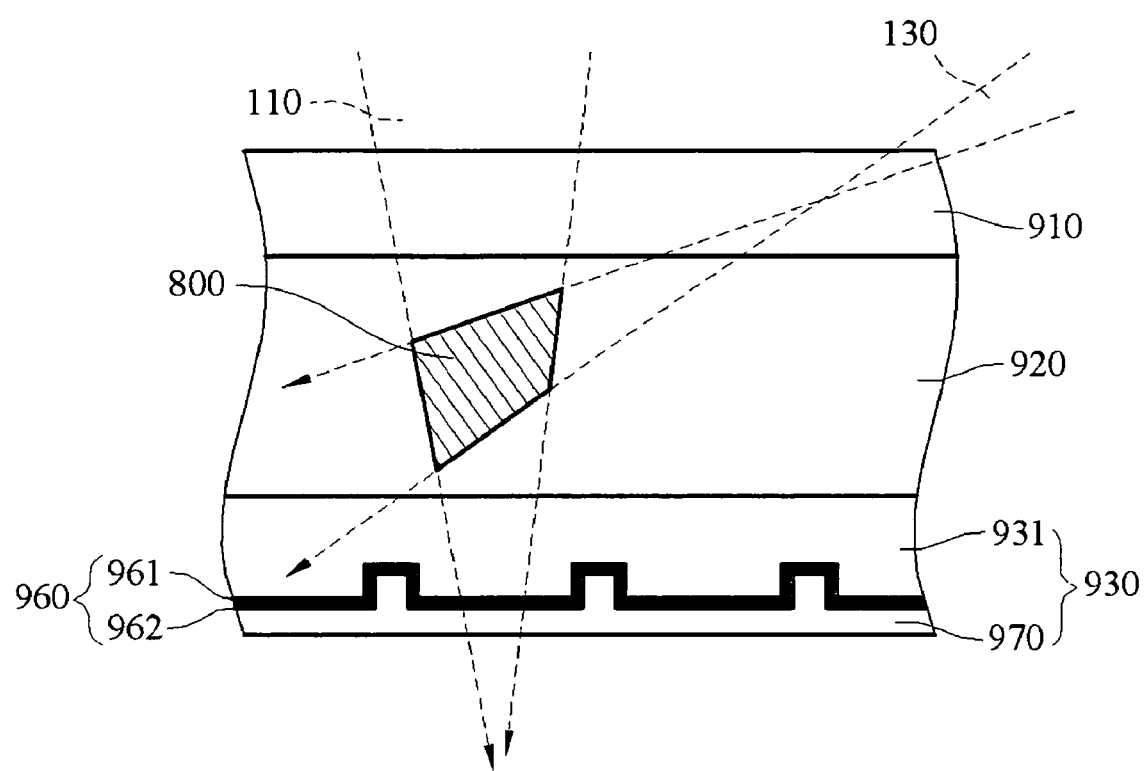
FIG. 2 is a schematic view of the holographic storage media of the present invention.

FIG. 2 is a schematic view of a holographic storage media adopted by the present invention. The holographic storage medium is adopted for recording at least one holographic interferogram 800. The holographic storage media 900 includes a first substrate 910 and a second substrate 930. A recording layer is interposed between the first substrate 910 and the second substrate 930, thus the recording layer 920 records light signals, such as a holographic interferogram 800.

Figure 1A:
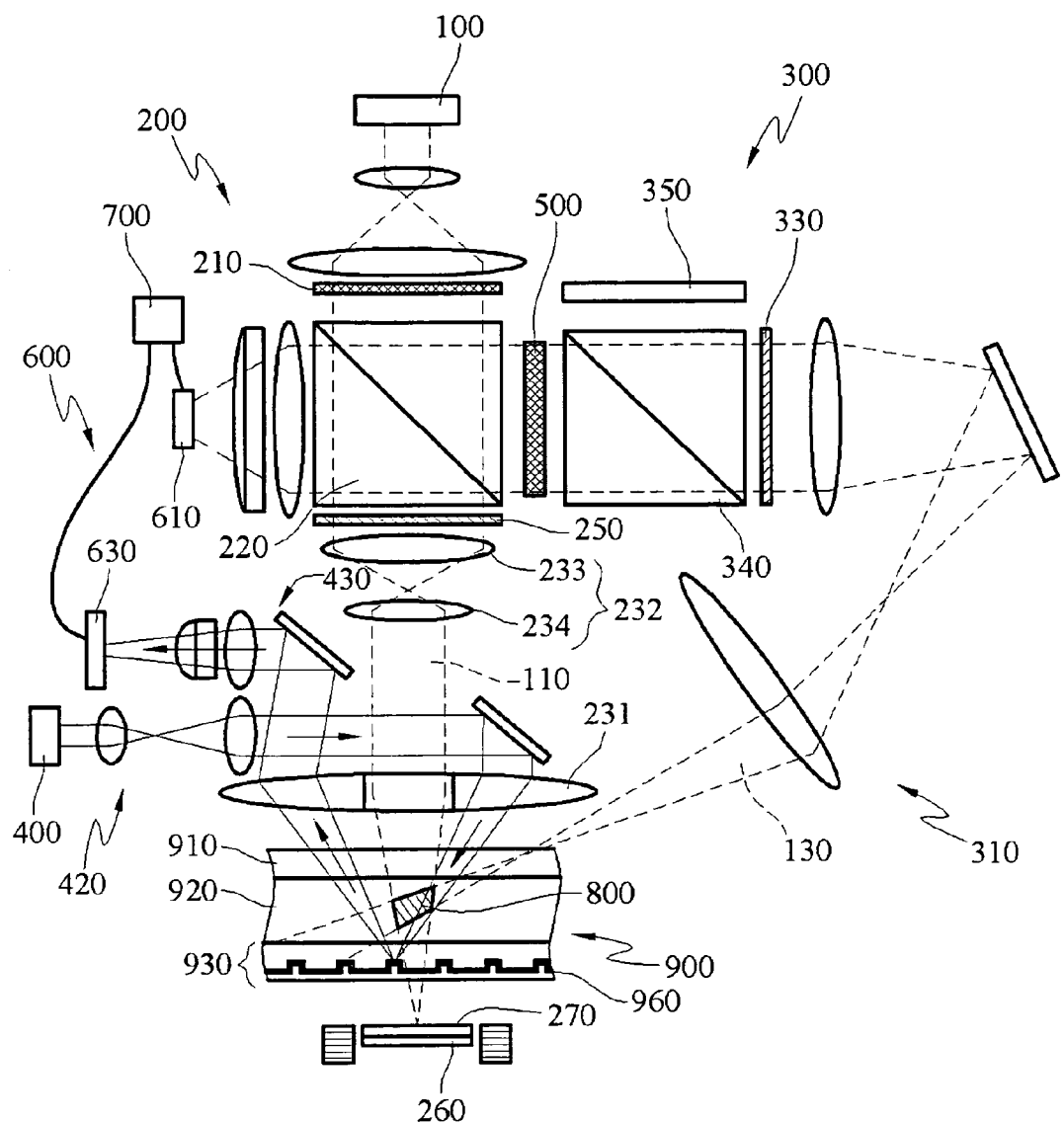
FIG. 1A is a schematic view of the combination of the first embodiment of the present invention.

FIG. 1A is a schematic view of a first embodiment of the present invention. The first embodiment of the present invention provides a system for holographic storage and reproduction which has an optical servo. The holographic storage media is adopted by the system.

The second substrate 930 of the holographic storage media 900 includes a substrate 931, a protection layer 970, and a servo layer 960. The protection layer 970 is adhered to a side of the second substrate 930, wherein the side is not adhered to the recording layer 920. The servo layer 960 includes a servo track 961 and a wavelength selection film 962. The servo track 961 includes a plurality of pits or bumps, like the servo tracks of CD/DVD discs in the art. The arrangement of the servo track 961 and the wavelength selection film 962 is according to the position of the servo track 961, and the detail of structure thereof will be discussed in the following embodiments. When a light beam is projected to the servo track 961, the light beam is modulated by the servo track 961 and then reflected by the wavelength selection film 962, and is received by a controlling device 700, such that the position of the beam on the holographic storage media 900 is obtained.

A light source 100 emits coherence light. The coherence light is split into a reference beam 110 and a signal beam 130 after passing through a first light guiding portion 200. The reference beam 110 is guided by the first light guiding portion 200 to be projected to the holographic storage media 900 in a first incidence direction. In the first embodiment, the first incidence direction is a direction perpendicular extending into the holographic storage media 900. The signal beam 130, split by the first light guiding portion 200, is projected to a spatial light modulator (SLM) 500. The signal beam 130 is modulated by the SLM 500, and then guided by a second light guiding portion 300 to be projected to the holographic storage media 900 in a second incidence direction. The polarization of the signal beam 130 is the same as that of the reference beam 110, such that the reference beam 110 and the signal beam 130 interfere with each other in the recording layer 920 of the holographic storage media 900, a holographic interferogram 800 is generated and then recorded in the recording layer 920.

Figure 1B:
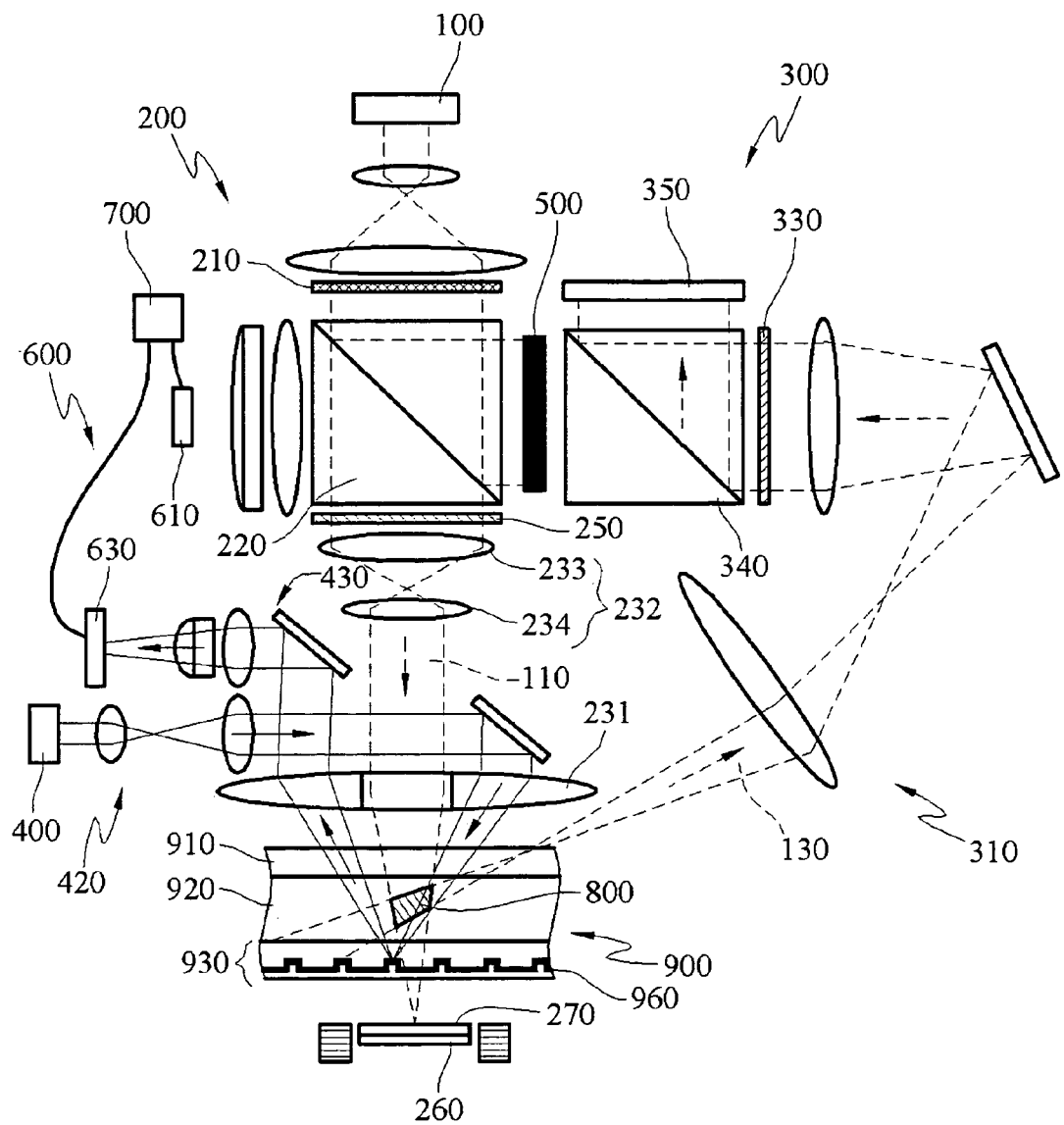
FIG. 1B is a schematic view of the reproduction of the first embodiment of the present invention.

FIG. 1B is a schematic view of the first embodiment of the present invention, showing the system reproducing the holographic interferogram.

When the reference beam 110 is projected to the holographic interferogram 800 in the first incidence direction, a reproducing beam 150 is generated and then projected to a two-dimensional image sensor 350 along the path of the signal beam 130. The reproducing beam 150 is then analyzed by the two-dimensional image sensor 350. Meanwhile, the spatial light modulator (SLM) 500 is in light-blocking state so as to prevent the light coming from the SLM 500 from being projected to a second light guiding portion 300.

The system further comprises a servo light source 400 for generating a servo beam 410. The servo beam 410 is projected to the servo track 961 of the holographic storage media 900 through the servo beam guiding portion 420. The servo beam 410 is modulated and reflected by the servo track 961 and is then received by a servo sensing portion 630. The servo sensing portion 630 converts the servo beam 410 reflected by the servo track 961 into an electrical signal, and then transmits the electrical signal to a controlling device 700. The controlling device 700 analyzes the signal for controlling the system, to ensure the servo beam 410 to focus on the servo track 961 of the holographic storage media 900 and continuously moves along the servo track 961. At the same time, data addresses and data on the servo track 916 are decoded. Moreover, the first embodiment further comprises a servo beam guiding portion 420 for guiding the reference beam 110 to pass through the holographic storage media 900 and to be reflected by a reference beam reflecting mirror 260. Thereby the reference beam 110 is projected to a reference beam sensing portion 610 and is then converted to an electrical signal transmitted to the controlling device 700. The controlling device 700 analyzes the electrical signal and then adjusts the distance and the incident angle between the reference beam reflecting mirror 260 and the reference beam 110, so as to keep the reflecting surface of the reflecting mirror 260 be perpendicular to the direction of the reference beam 110 and focus on the reference beam reflecting mirror 260. Thus, the reference beam 110 is projected to the holographic storage media 900 along the first incidence direction, and the holographic interferogram 800 is continuously recorded on the recording layer 920 of the holographic storage media 900 along the servo track 961.

The first light guiding portion 200 is for splitting the light generated by the light source 100 into the signal beam 130 and the reference beam 110, and guiding the reference beam 110 to be projected to the holographic storage media 900 along the first incidence direction. A polarizing film 210 is disposed in front of the light source 100 for polarizing the light generated by the light source 100 to a polarized light, i.e. a linear polarized light. As shown in the figure, the polarization direction parallel to the paper is referred to as a P polarization, and the polarization direction perpendicular to the paper is referred to as an S polarization. In the first embodiment, light passing through the polarizing film 210 is polarized to the P polarization. The light with the P polarization is then split into the signal beam 130 and the reference beam 110 by a splitter 220, thus the signal beam 130 and the reference beam 110, both are in P polarization.

After being modulated by the SLM 500, the signal beam 130 is guided by the second light guiding portion 300 to be projected to the holographic storage media 900 along the second incidence direction. The direction of the signal beam 130 is modified by one or more lenses and one or more reflecting mirror sets 310, then the signal beam 130 is projected to the holographic storage media 900 along the second incidence direction. Therefore, guided by the first light guiding portion 200 and the second light guiding portion 300, the reference beam 110 and the signal beam 130 are projected to the recording layer 920 of the holographic storage media 900 respectively along the first incidence direction. Meanwhile, the polarization states of the reference beam 110 and the signal beam 130 are identical by the first light guiding portion 200 and the second light guiding portion 300. Therefore, the reference beam 110 and the signal beam 130 interfere with each other to generate the holographic interferogram 800 which is simultaneously recorded in the recording layer 920.

Furthermore, the first light guiding portion 200 further includes an objective lens set 230, and the reference beam 110 is converged by the objective lens set 230 before it is projected to the holographic storage media 900.

The path on which the reference beam 110 travels in holographic reproducing is opposite to that in holographic recording, such that when the reference beam 110 passes through the holographic interferogram 800 recorded in the recording layer 920, a conjugate reproducing beam 150 is generated, and the conjugate reproducing beam 150 travels along the path on which the signal beam 130 travels. Split by a polarizing splitter 340, the conjugate reproducing beam 150 is obtained. Moreover, the first light guiding portion 200 further includes a first phase delay film 250, a reference beam reflecting mirror 260, and a fourth phase delay film 270. The second light guiding portion 300 further includes a second phase delay film 330. Wherein the first phase delay film 250 and the second phase delay film 330 are ½ wavelength delay films, which are used for converting a light from P polarization into S polarization, or, on the contrary, converting a light from S polarization to P polarization. The first phase delay film, 250 is disposed at one side of the splitter 220, such that when the reference beam 110 with P polarization is projected to the first phase delay film 250, the polarization thereof is converted to the S polarization. A fourth phase delay film 270 is adhered to one side of the reference beam reflecting mirror 260. The fourth phase delay film 270 is a ¼ wavelength delay film, so that a light with P polarization is converted twice into a light with S polarization after being projected to the fourth phase delay film 270.

The second phase delay film 330 of the second light guiding portion 300 is disposed in the path of the signal beam 130. A first polarizing splitter 340 is also disposed in the path of the signal beam 130. After being projected to the SLM 500, the signal beam 130 is projected to the second phase delay film 330, such that the polarization of the reference beam 130 is converted into the S polarization. The polarizations of the reference beam 110 and the signal beam 130 are both S polarization. Therefore, the signal beam 130 and the reference beam 110 interfere with each other to generate the holographic interferogram 800 recorded in the recording layer 920 of the holographic storage media 900.

In conclusion, in holographic reproducing, the reference beam 110 is converted into S polarization after passing through the first phase delay film 250, and it is converged after passing the objective lens 231. Then the reference beam 110 passes through the holographic storage media 900 and focuses on the reference beam reflecting mirror 260. The reference beam 110 is reflected to the path on which it is projected to the reference beam reflecting mirror 260. After being projected to and reflected by the mirror 260, the reference beam 110 passes through the fourth phase delay film 270 twice, so that it is converted twice to be a light with P polarization. When the reference beam 110 passes through the holographic interferogram 800 again, the conjugate reproducing beam 150 is generated, and the conjugate reproducing beam 150 then travels back along the path of the signal beam 130. As the conjugate reproducing beam 150 is generated by the reference beam 110 with P polarization projected to the holographic interferogram 800, the polarization of the conjugate reproducing beam 150 also is P polarization. Therefore, when traveling back along the path of the signal beam 130, the conjugate reproducing beam 150 passes through the second phase delay film 330. The polarization of the conjugate reproducing beam 150 is converted by the second phase delay film 330_into S polarization. When the conjugate reproducing beam 150 is projected to the first polarizing splitter 340, as the polarization state thereof is the S polarization, the conjugate reproducing beam 150 is reflected by first polarizing splitter 340. A two-dimensional spatial image sensor 350 is located on one side of the first polarizing splitter 340 in the reflection direction of the conjugate reproducing beam 150 to receive and analyze the conjugate reproducing beam 150, as shown in FIG. 1B.

In addition, the system further comprises an optical servo, which includes a servo light source 400 and a servo beam guiding portion 420. The servo light source 400 is adopted for generating a servo beam 410. The wavelength of the servo beam 410 is different from the wavelengths of the signal beam 130 and the reference beam 110. The servo beam guiding portion 420 is adopted for changing the direction of the servo beam 410, such that the servo beam 410 is projected to the holographic storage media 900, and focuses on the servo track 961 of the holographic storage media 900 through the objective lens 231.

The servo track 961 is disposed between the protection layer 970 and the substrate 931, so the servo track 961 is isolated by the protection layer 970 and the substrate 931, and an isolation layer is not needed for isolating the servo track 961. The servo track 961 is directly formed on the substrate 931, and a wavelength selection film 962 is coated on the side of the servo track 961 facing the protection layer 970. Therefore, the servo beam 410 is reflected by the wavelength selection film 962 coated on the servo track 961. The servo beam 410 reflected is then projected to a servo beam sensor 630 of the sensing portion 600 through servo beam reflecting mirror set 430, such that the servo beam 430 is converted to an electrical signal transmitted to the controlling device 700. Through the controlling device 700, the holographic interferogram 800 is continuously recorded in the holographic storage media 900 along the servo track 961. In addition, after the reference beam 110 passes through the holographic storage media 900 and is reflected by the reflecting mirror, it travels back along the original path and is projected to the splitter 220. A part of the reference beam 110 is reflected by the splitter 220 and is projected by the splitter 220 from the other side of the splitter 220. A reference sensor 610 of the sensing proportion 600 is located herein to receive the reference beam 110 and to convert it to an electrical signal, such that the controlling device 700 analyzes the electrical signal and adjusts the distance and the incident angle between the reference beam reflecting mirror 260 and the reference beam 110, so as to keep the reflecting surface of the reflecting mirror 260 to be perpendicular to the path on which the reference beam 110 travels and to keep the reference beam 110 focusing on the reflecting mirror 260.

The first light guiding portion 200 further includes a second objective lens 232. The second objective lens 232 is used for reducing the diameter of the reference beam 110. The second objective lens 232 includes a first lens 233 and a second lens 234. The focus of the second lens 234 coincides with that of the first lens 233, and the focal length of the second lens 234 is shorter than that of the first lens 233. Therefore, the diameter of the reference beam 110 is reduced after the reference beam 110 passing through the first and lens 233 and second lens 234, such that the size of the objective lens 231 can be minimized.

In the first embodiment, the SLM 500 is a transmissive SLM, such as a transmissive liquid crystal panel.

If the servo tracks of the servo layer of a holographic storage media is designed to be a multi-layer structure, the servo beam 410 can be projected to the servo tracks 961 in different layers, and the holographic interferogram 800 is recorded in layers of the holographic storage media, such that the storage capacity of the holographic storage media 900 is increased.

Figure 3:
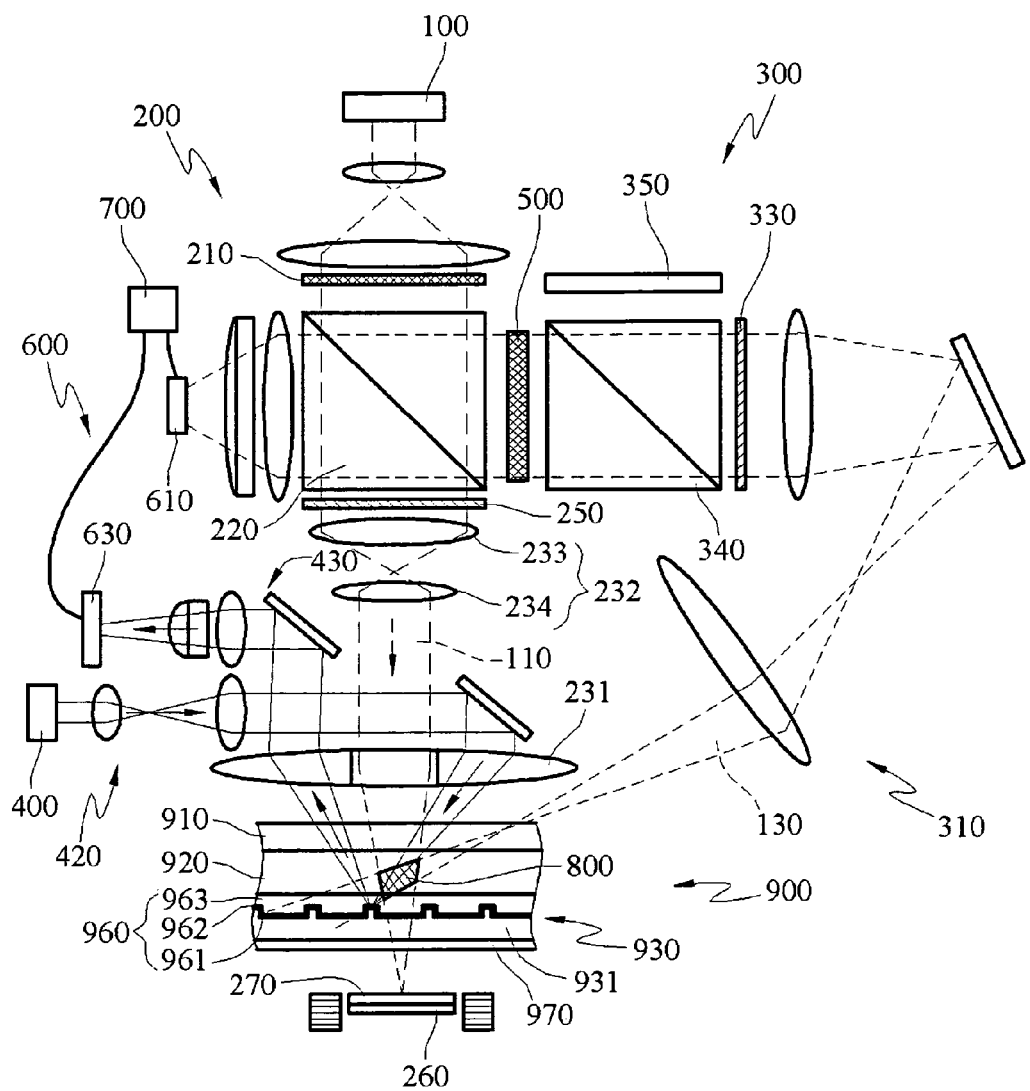
FIG. 3 is a schematic view of the combination of the second embodiment of the present invention.

FIG. 3 is a schematic view of a second embodiment of the present invention. The second embodiment is provided for generating holographic interferogram in the recording layer 920 of the holographic storage media 900. The holographic storage media 900 has a servo layer 960. The structure of the servo layer is the same as that of the first embodiment, but the servo track 960 is adhered to the side of the second substrate 930 facing the recording layer 920. The servo track 961 has a plurality of pits or bumps, such as servo tracks of CD/DVD disks in the art. A wavelength selection film 962 is coated on the servo track 961, and an isolation layer 963 is adhered to the wavelength selection film 962.

When a light or a beam is projected to the servo track 961, it is modulated by the servo track 961 and then reflected by the wavelength selection film 962. The light or beam reflected is received by a servo beam sensor 630 and is converted to an electrical signal transmitted to the controlling device 700. The controlling device 700 analyzes electrical signal, and controls the optical servo on the holographic storage media 900. Thus, the focus of the servo beam 410 falls on the servo track 961 of the holographic storage media 900 and continuously moves along the servo track 961. Meanwhile, data address and data on the servo track 961 are decoded. Thus the optical servo on the holographic storage media 900, the reference beam 110, and the signal beam 130 is moved to the predetermined data addresses, and the reference beam reflecting mirror 260 is moved synchronically.

Figure 4:
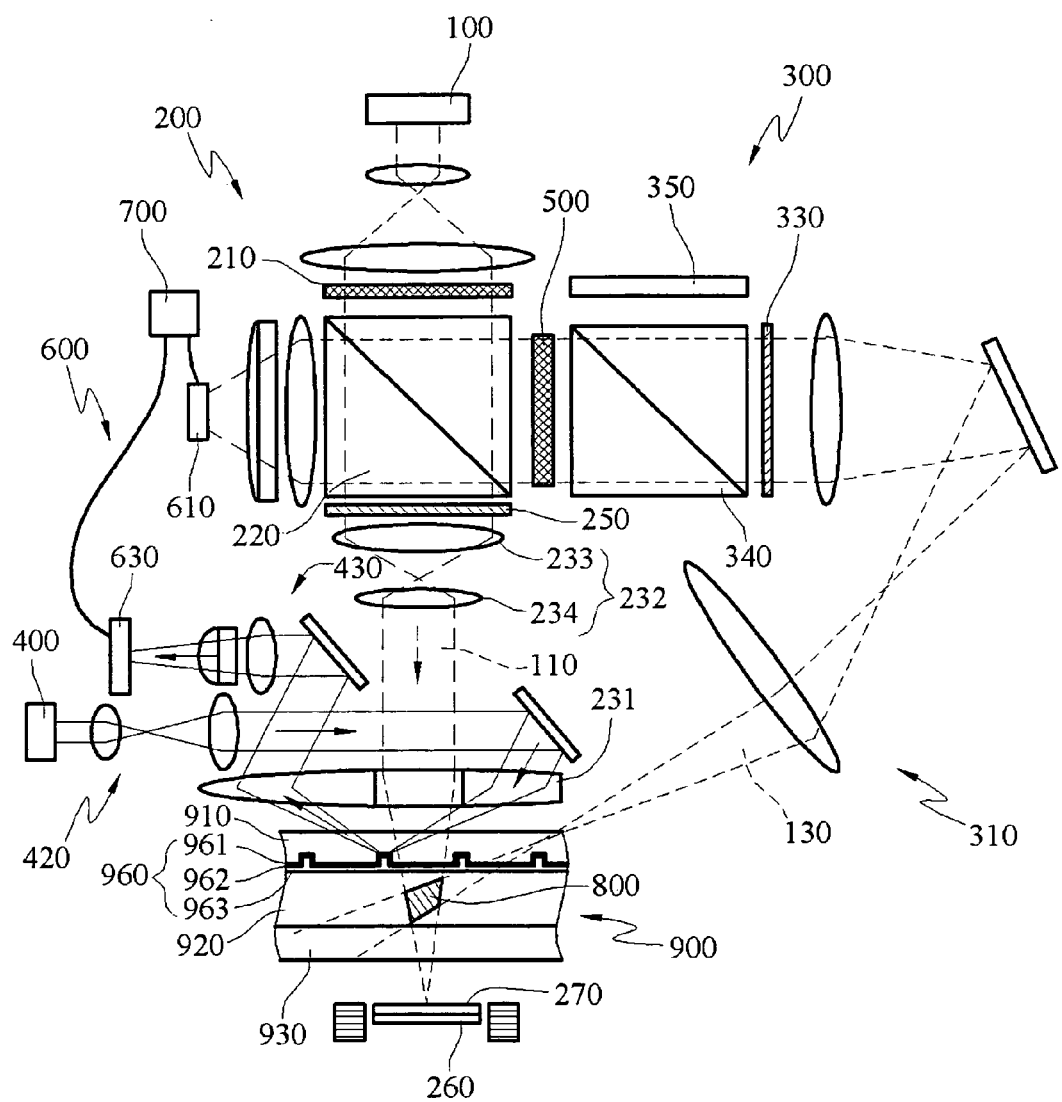
FIG. 4 is a schematic view of the combination of the third embodiment of the present invention.

FIG. 4 is a schematic view of a third embodiment of the present invention. The third embodiment is provided for generating holographic interferogram in a first substrate 910 of a holographic storage media 900. The holographic storage media 900 has a servo layer 960, which is disposed on the side of the first substrate 910 facing the recording layer 920. The servo track 961 is directly formed on the first substrate 910. A wavelength selection film 962 is coated on the side of the servo track 961 facing the recording layer 920. An isolation layer 963 is adhered to the wavelength selection film 962. The servo track 961 comprises a plurality of pits or bumps. When a light or a beam is projected to the servo track 961, it is modulated by the servo track 961 and is then reflected by the wavelength selection film 962. The light or beam reflected is received by a servo beam sensor 630 and is converted to an electrical signal transmitted to the controlling device 700. The controlling device 700 analyzes the electrical signal to control the optical servo on the holographic storage media 900. Thus, the focus of the servo beam 410 falls on focuses on the servo track 961 of the holographic storage media 900 and continuously moves along the servo track 961. Meanwhile, data address and data on the servo track 961 are decoded. Thus the optical servo on the holographic storage media 900, the reference beam 110 and the signal beam 130 are moved to predetermined data addresses, and the reference beam reflecting mirror 260 is moved synchronically.

Figure 5A:
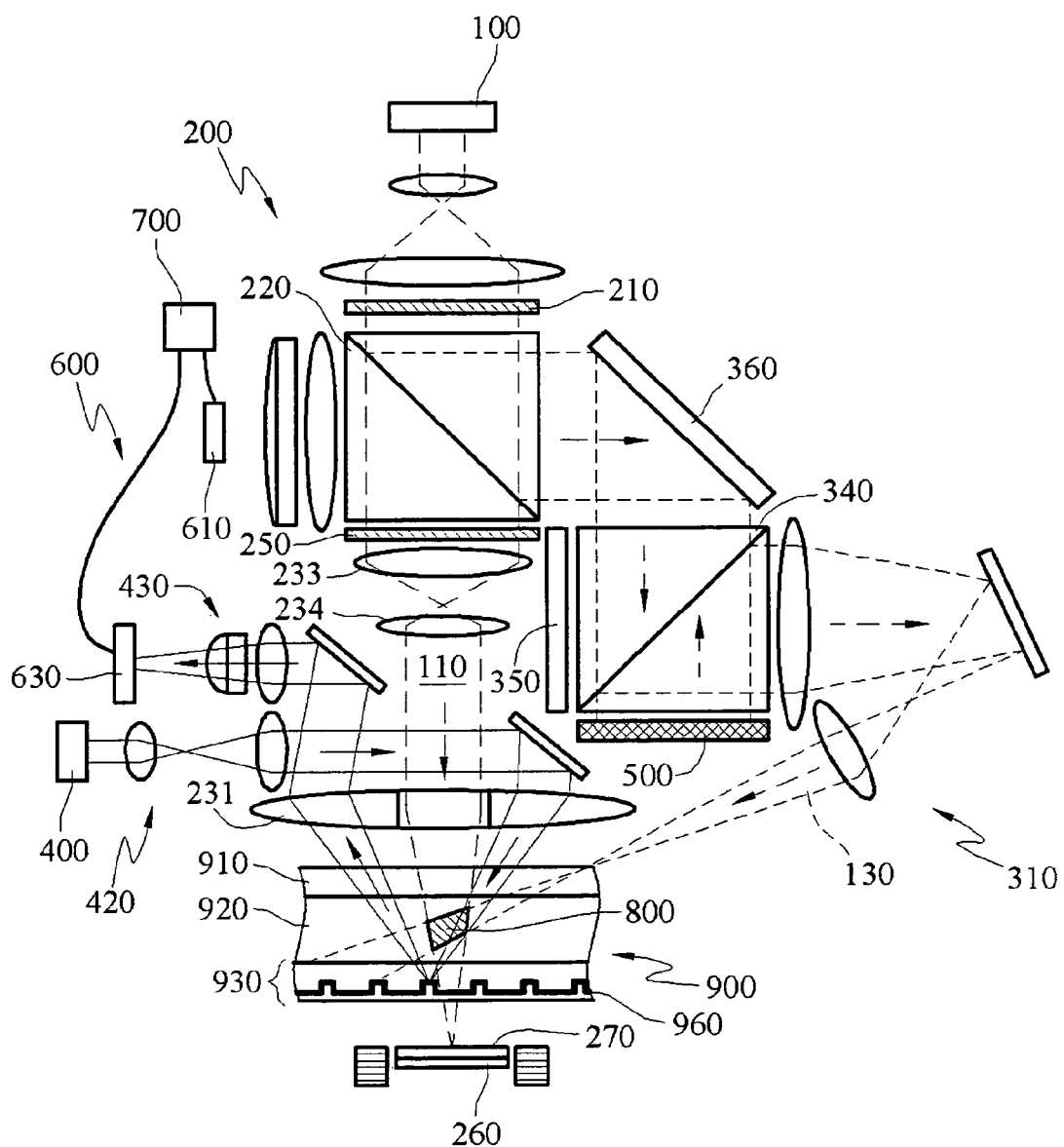
FIG. 5A is a schematic view of the combination of the fourth embodiment of the present invention.

FIG. 5A is a schematic view of a fourth embodiment of the present invention. The fourth embodiment is similar to the first embodiment, but the SLM 500 of the fourth embodiment is a reflective SLM, such as liquid crystal on silicon (LCOS). When a light or a beam with P polarization state is projected to the SLM 500, it is converted in to S polarization by the SLM 500, and reflected by the SLM 500.

The second light guiding portion 300 is different from that of the first embodiment. The second light guiding portion 300 includes a first reflecting mirror 360, a first polarizing splitter 340, and a two-dimensional image sensor. The first reflecting mirror 360 is adopted for changing the direction of the signal beam 130, such that the signal beam 300 is projected to the SLM 500. The polarization of the signal beam 130 is changed by the SLM 500, and then is reflected and is projected the SLM 500.

A first polarizing splitter 340 is disposed on the path of the signal beam 130, such that the signal beam 130 reflected by the SLM 500 is projected to the first polarizing splitter 340. Therefore, the polarization of the signal beam 130 is converted by the SLM 500, and the signal beam 130 is reflected by the first polarizing splitter 340, and is then projected to the lenses and reflecting mirror sets 310. Thus the signal beam 130 is projected to the holographic storage media 900 along a second incidence direction. The polarization of the signal beam 130 is the same as that of the reference beam 110, such that the signal beam 130 and the reference beam 110 interfere with each other in the holographic storage media 900, and generates the holographic interferogram 800 in the holographic storage media 900.

Figure 5B:
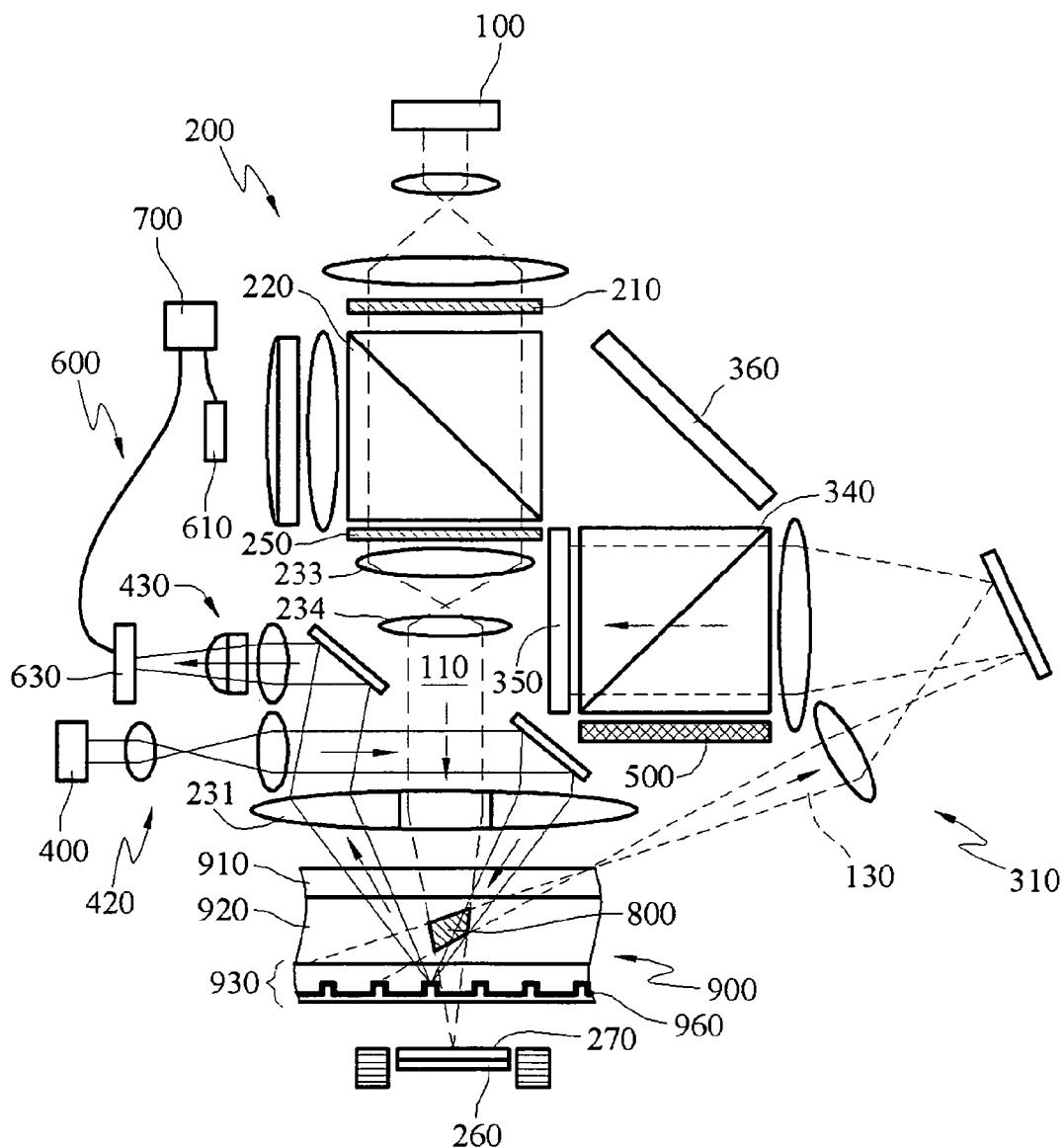
FIG. 5B is a schematic view of the reproduction of the fourth embodiment of the present invention.

FIG. 5B is a schematic view of the fourth embodiment of the present invention, showing the system reproducing the holographic interferogram.

When the reference beam 110 passing through the first phase delay film 250 is projected to the holographic interferogram 800 and is reflected by the reflecting mirror. A fourth phase delay film 270 is adhered to one side of the reflecting mirror, the reference beam 110 will pass through the fourth phase delay film 270 twice, such that the polarization of the reference beam 110 is converted to P polarization. When the reference is reflected and projected to the holographic interferogram 800 again, a conjugate reproducing beam 150 is generated. The conjugate reproducing beam 150 travel back along the path of the signal beam 130, and passes through the first polarizing splitter 340 through the lenses and reflecting mirror sets 310.

A two-dimensional image sensor 350 is located on one side of the first polarizing splitter 340 for receiving the reproducing beam 150 passing through the first polarizing splitter 340.

Other structure of this embodiment is similar to that of the first embodiment, and thus will not be described herein.

Figure 6A:
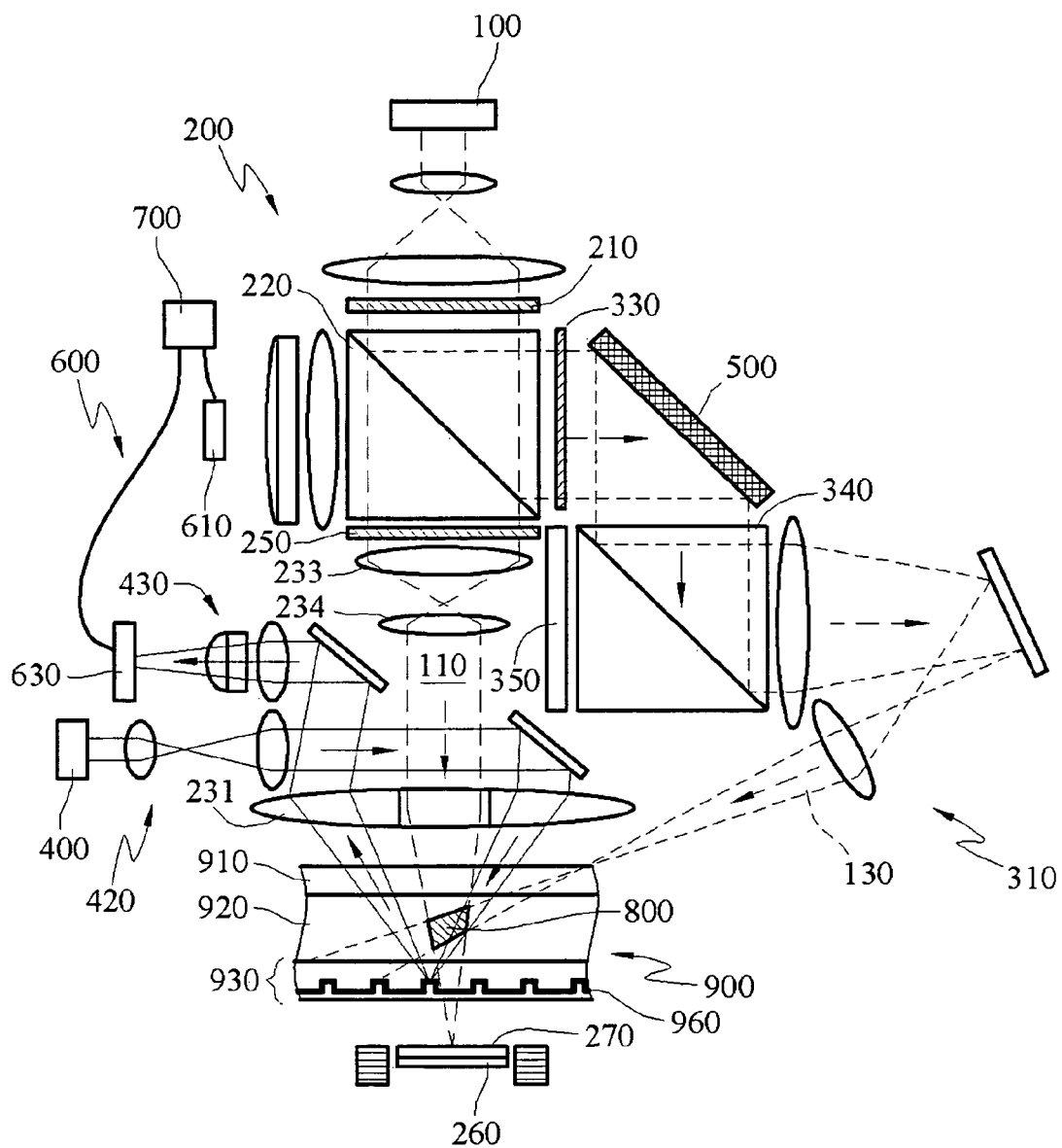
FIG. 6A is a schematic view of the combination of the fifth embodiment of the present invention.

FIG. 6A is a schematic view of a fifth embodiment of the present invention. The fifth embodiment is similar to the first embodiment, but the SLM 500 of the fifth embodiment is a reflective SLM, such as a digital micro mirror device (DMD). When a light of a beam is projected to the SLM 500, the light or beam is modulated and reflected by the SLM 500, while the polarization of the light or beam reflected and modulated is not converted.

Therefore, the second light guiding portion 300 of the fifth embodiment has to be modified correspondingly. After the signal beam 130 passing through the second phase delay film 330 and being projected to the SLM 500, it is reflected and then projected to the first polarizing splitter 340.

The polarization of the signal beam 130 is converted from P polarization to S polarization after passing through the second phase delay film 330, such that the signal beam 130 is reflected by the first polarizing splitter 340 to be projected to the lenses and reflecting mirror sets 310. Then the signal beam 130 is projected to the holographic storage media 900 along the second incidence direction, and interferes with the reference beam 110, to generate the holographic interferogram 800.

Figure 6B:
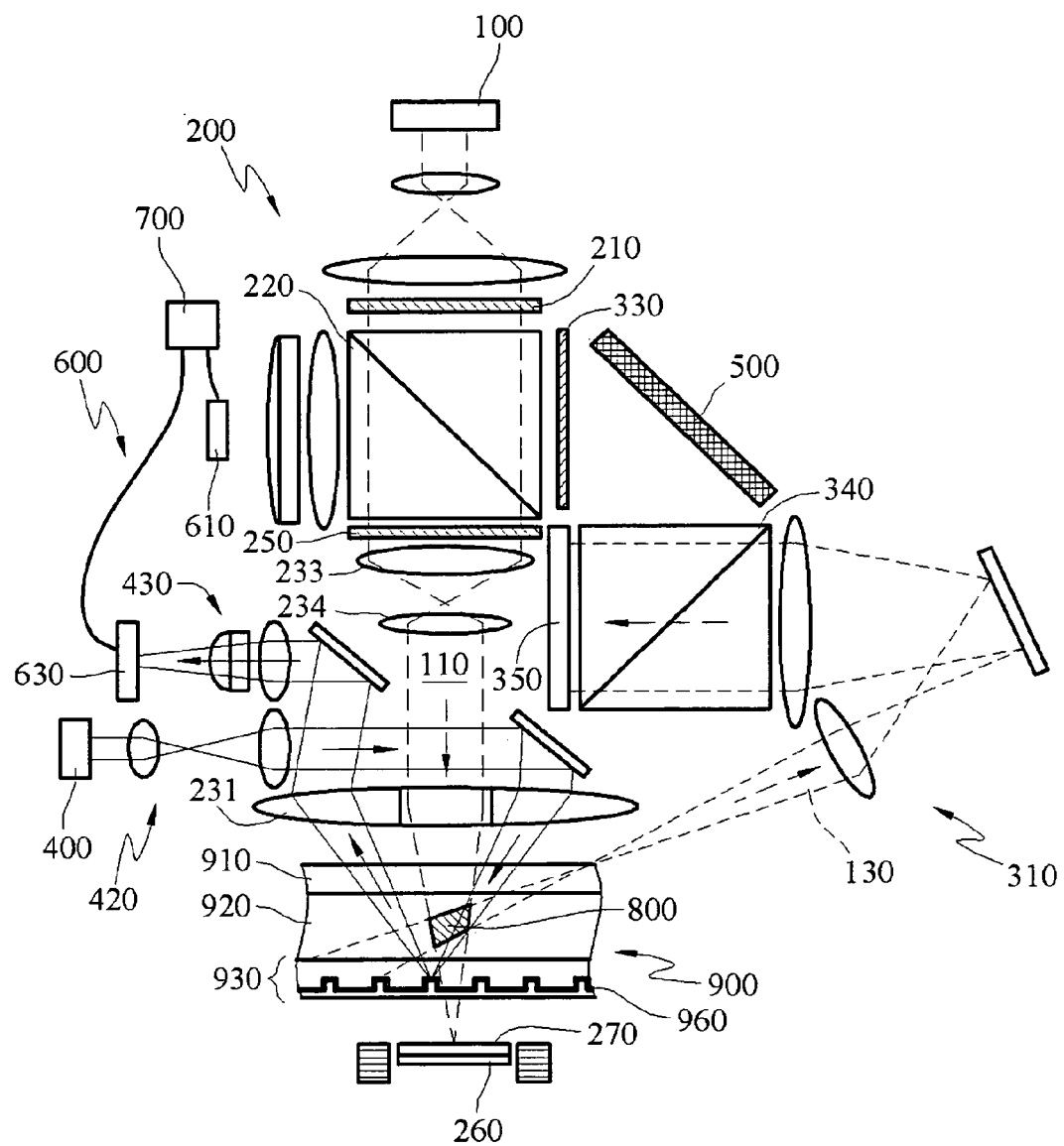
FIG. 6B is a schematic view of the reproduction of the fifth embodiment of the present invention.

FIG. 6B is a schematic view of the fifth embodiment of the present invention, showing the system reproducing the holographic interferogram.

When the reference beam 110 passing through the first phase delay film 250 is projected to the holographic interferogram 800, it is reflected by the reflecting mirror. A fourth phase delay film 270 is adhered to one side of the reflecting mirror, such that the reference beam 110 passes through the fourth phase delay film 270 twice, the polarization of the reference beam 110 is converted to P polarization. After the reference beam 110 is projected to the holographic interferogram 800 again, a conjugate reproducing beam 150 is generated. The conjugate reproducing beam 150 travels back along the path of the signal beam 130, and passes through the first polarizing splitter 340 through the lenses and reflecting mirror sets 310.

A two-dimensional image sensor 350 is located on one side of the first polarizing splitter 340 for receiving the conjugate reproducing beam 150 passing through the first polarizing splitter 340.

Other structure of this embodiment is similar to that of the first embodiment, and thus will not be described herein.

Figure 7:
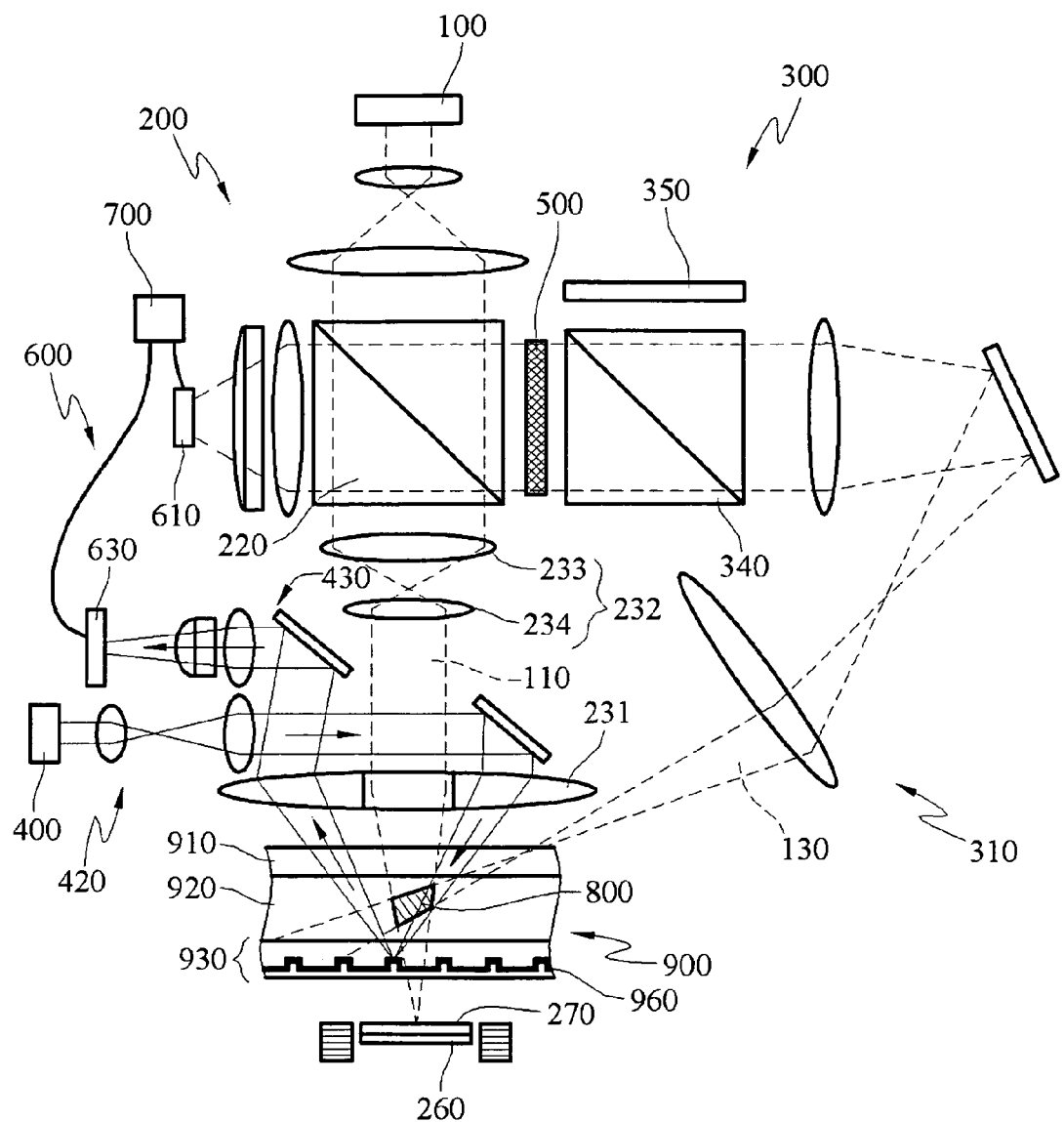
FIG. 7 is a schematic view of the combination of the sixth embodiment of the present invention.

FIG. 7A is a schematic view of a sixth embodiment of the present invention. The sixth embodiment is similar to the first embodiment. But both the first phase delay film 250 and the second phase delay film 330 are not adopted in the first light guiding portion 200 and the second light guiding portion 300, thus the polarization reference beam 110 is not changed and remains to be P polarization. After the signal beam 130 is projected to the SLM 500, it passes through the first polarizing splitter 340 and is guided by the lenses and reflecting mirror sets 310 to be projected to the holographic storage media 900 along the second incidence direction. Since the polarization of the signal beam 130 is not changed and remains to be P polarization, the signal beam 130 and the reference beam 110 interfere with each other in the holographic storage media 900 to generate the holographic interferogram 800.

When the reference beam 110 passing through the first phase delay film 250 is projected to the holographic interferogram 800, it is reflected by the reflecting mirror. A fourth phase delay film 270 is adhered to one side of the reflecting mirror. The reference beam 110 passes through the fourth phase delay film 270 twice, thus the polarization of the reference beam 110 is converted to S polarization, and then is reflected and projected to the holographic interferogram 800 again to generate the conjugate reproducing beam 150. The conjugate reproducing beam 150 travels back along the path of the signal beam 130, and is guided by the lenses and reflecting mirror sets 310 to be projected to the first polarizing splitter 340, reflected by the first polarizing splitter 340. Then the conjugate reproducing beam 150 is projected the polarizing splitter 340 from the other side of the polarizing splitter 340.

A two-dimensional image sensor 350 is located on one side of the first polarizing splitter 340 to receive the reproducing beam 150 passing through the first polarizing splitter 340.

Other structure of this embodiment is similar to that of the first embodiment, and thus will not be described herein.

Figure 8A:
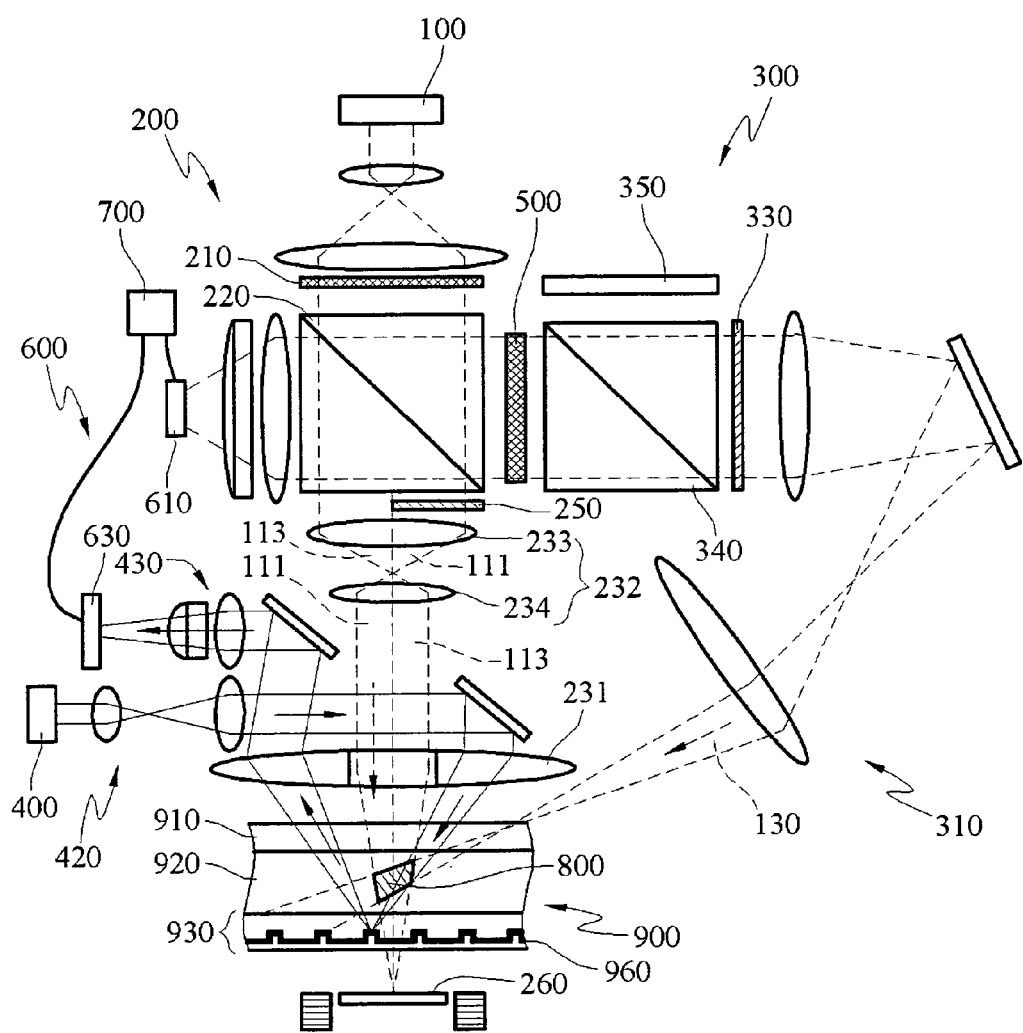
FIG. 8A is a schematic view of the combination of the seventh embodiment of the present invention.

FIG. 8A is a schematic view of the seventh embodiment of the present invention. The seventh embodiment is similar to the first embodiment. But in the seventh embodiment, the first phase delay film 250 does not completely cover the splitter 220, instead of covering only half of the splitter 220. The fourth phase delay film 270 is omitted on the reference beam reflecting mirror 260. After the reference beam 110 is projected the splitter 220, a part of the reference beam 110 is projected to the first phase delay film 250, which is referred to as the first reference beam 111, while a part of the reference beam 110 will not be projected to the first phase delay film 250, which is referred to as the second reference beam 113. The first reference beam 111 passes through the first phase delay film 250, so its polarization is converted to S polarization. Then the first reference beam 111 is projected to the holographic storage media 900. The signal beam 130 also passes through the second phase delay film 330, so its polarization is also converted to S polarization. Therefore, the first reference beam 111 and the signal beam 130 interfere with each other in the holographic storage media 900, to generate the holographic interferogram 800. Both the second reference beam 113 and the first reference beam 111 pass through the holographic storage media 900, and are reflected by the reference beam reflecting mirror 260 to travel back along the original path and be projected to the splitter 220. Moreover, a part of the second reference beam 113 and a part of the first reference beam 111 are reflected by the splitter 220 and leave the splitter 220 from the other side of the splitter 220, and to be projected to a reference beam sensor 610 of a sensing portion 600.

Figure 8B:
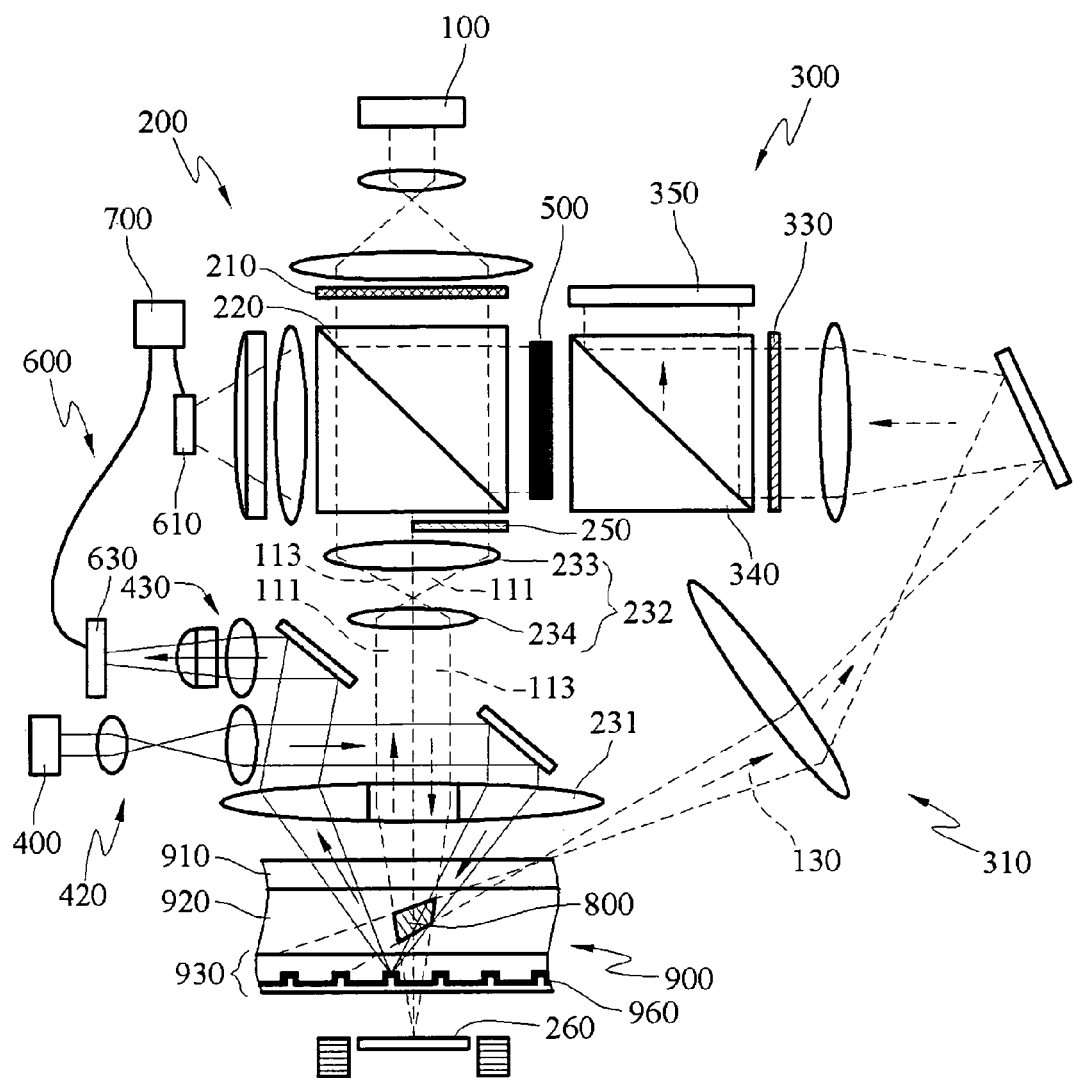
FIG. 8B is a schematic view of the reproduction of the seventh embodiment of the present invention.

FIG. 8B is a schematic view of he seventh embodiment of the present invention, showing the system reproducing the holographic interferogram. The second reference beam 113, which does not pass through the first phase delay film 250, passes through the holographic storage media 900 and is reflected by the reference beam reflecting mirror 260, such that the second reference beam 113 travels back along the path of the first reference beam 111, and is projected to the holographic interferogram 800. The direction of the second reference beam 113 is opposite to that of the right reference beam 111 when recording, therefore, the conjugate reproducing beam 150 which travels back along the path of the signal beam 130 is generated. As the conjugate reproducing beam 150 is generated by the second reference beam 113 projected to the holographic interferogram 800, the polarization the conjugate reproducing beam 105 is also P polarization. Therefore, when the conjugate reproducing beam 150 travels back along the original path of the signal beam 130, it passes through the second phase delay film 330 to change its polarization to S polarization. When the conjugate reproducing beam 105 is projected to the first polarizing splitter 340, as the polarization of the conjugate reproducing beam 150 is S polarization, it is reflected by the first polarizing splitter 340. A two-dimensional image sensor 350 is located on one side of the first polarizing splitter 340 in the reflection direction of the conjugate reproducing beam 150 for receiving and analyzing the conjugate reproducing beam 150.

Figure 9:
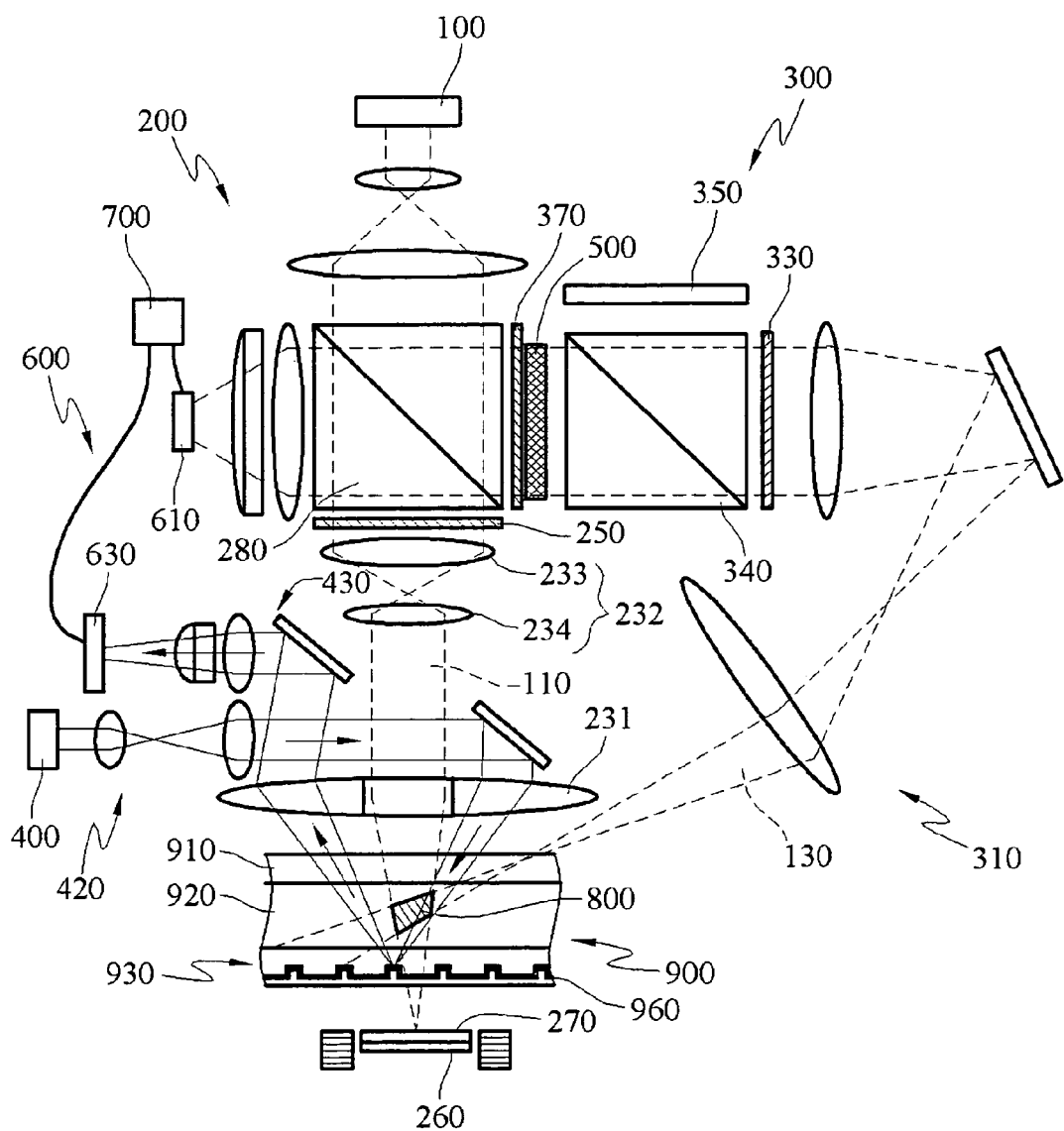
FIG. 9 is a schematic view of the combination of the eighth embodiment of the present invention.

FIG. 9 is a schematic view an eighth embodiment of the present invention. The eighth is similar to the first embodiment. In the eighth embodiment, the splitter 220 of the first light guiding portion 200 of the first embodiment is replaced by a third polarizing splitter 280. Thus the polarizing film 210 and the splitter 220 of the first light guiding portion 200 can be replaced by the third polarizing splitter 280. A third phase delay film 370 is disposed in the path of the signal beam 130, such that the signal beam 130 with S polarization split from the third polarizing splitter 280 is converted to P polarization after it is projected to the third phase delay film 370, and then is projected to the SLM 500. After that, the polarization of the signal beam 130 is converted from P polarization to S polarization after he signal beam 130 passes through the first polarizing splitter 340 and the second phase delay film 330, such that the polarization of the signal beam 130 is the same as that of the reference beam 110. The signal beam 130 and the reference beam 100 interfere with each other to generate the holographic interferogram 800.

Figure 10:
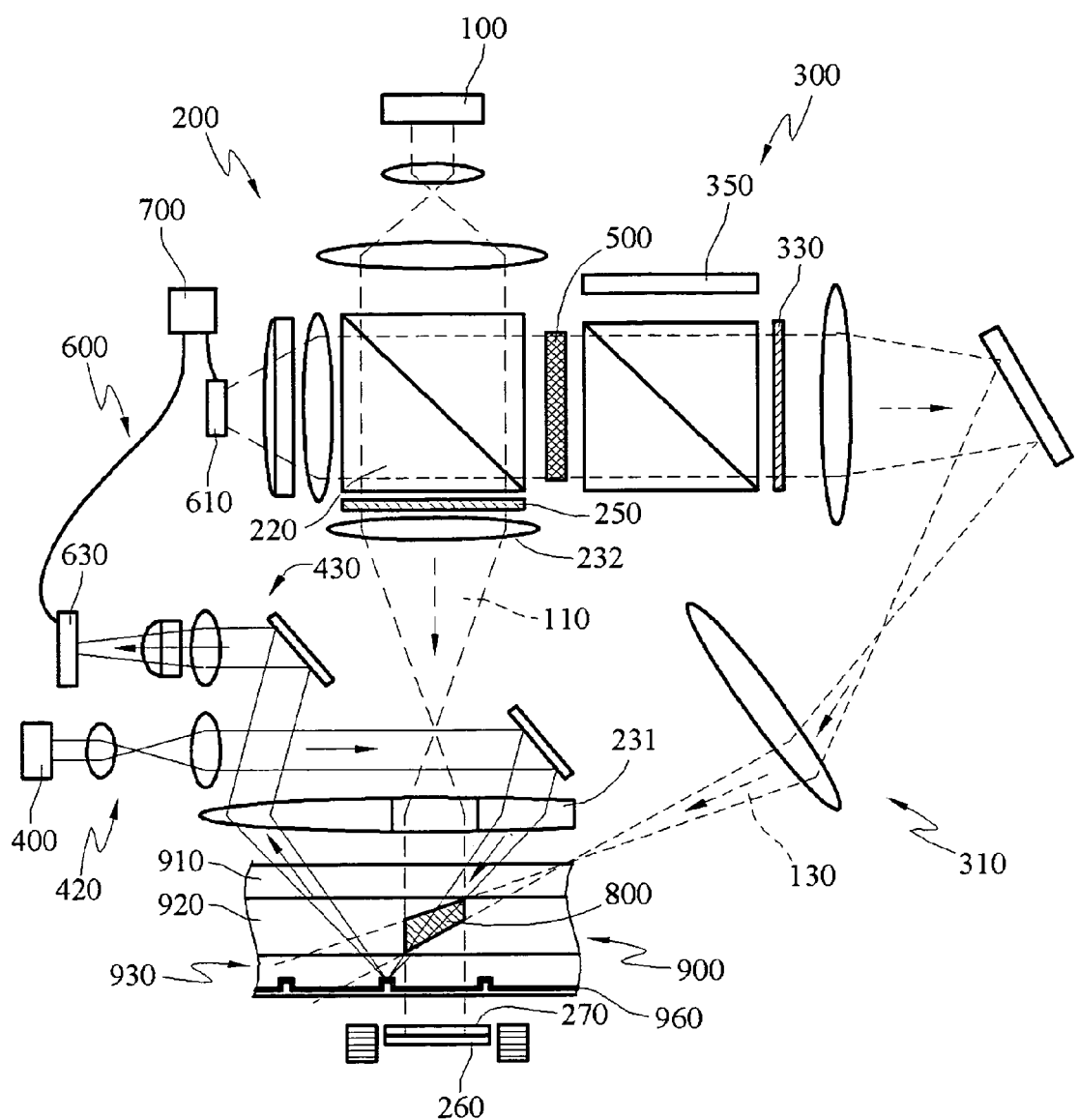
FIG. 10 is a schematic view of the combination of the ninth embodiment of the present invention.
Figure 11:
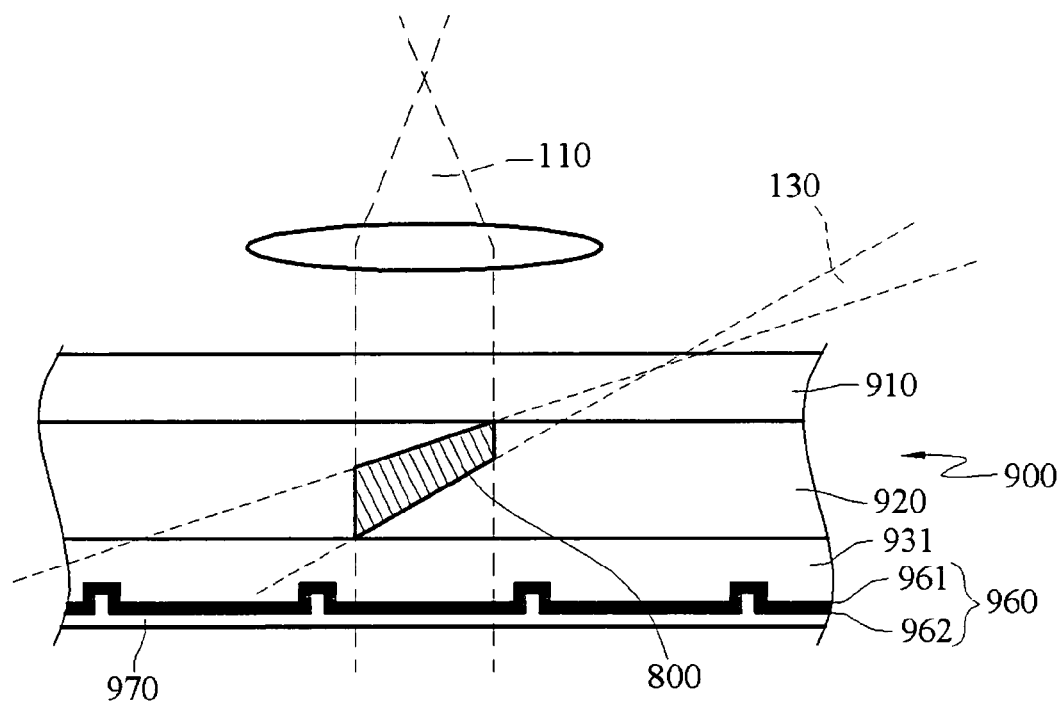
FIG. 11 is a schematic view of the interference of the signal beam and the reference beam of the ninth embodiment of the present invention.

FIG. 10 is schematic view a ninth embodiment of the present invention, and FIG. 11 is a schematic view of the interference of the signal beam and the reference beam of the ninth embodiment of the present invention. The ninth embodiment is also similar to the first embodiment, but the splitter 220 of the first light guiding portion 200 is replaced by a third polarizing splitter 280, and the focus of the second objective lens 232 coincides with that of the objective lens 231, such that the diameter of the reference beam 110 is reduced, and the reference beam 110 is projected to the holographic storage media 900 as a parallel light beam, and interferes with the signal beam 130 to generate the holographic interferogram 800.

Since the reference beam 110 is a parallel beam, the holographic interferogram 800 can be generated in the holographic storage media 900 in different layers. Since the servo tracks 961 of the holographic storage media are also formed in layers, the holographic interferogram 800 can be generated in different layer, which further increases the storage capacity of the holographic storage media 900.

Figure 12A:
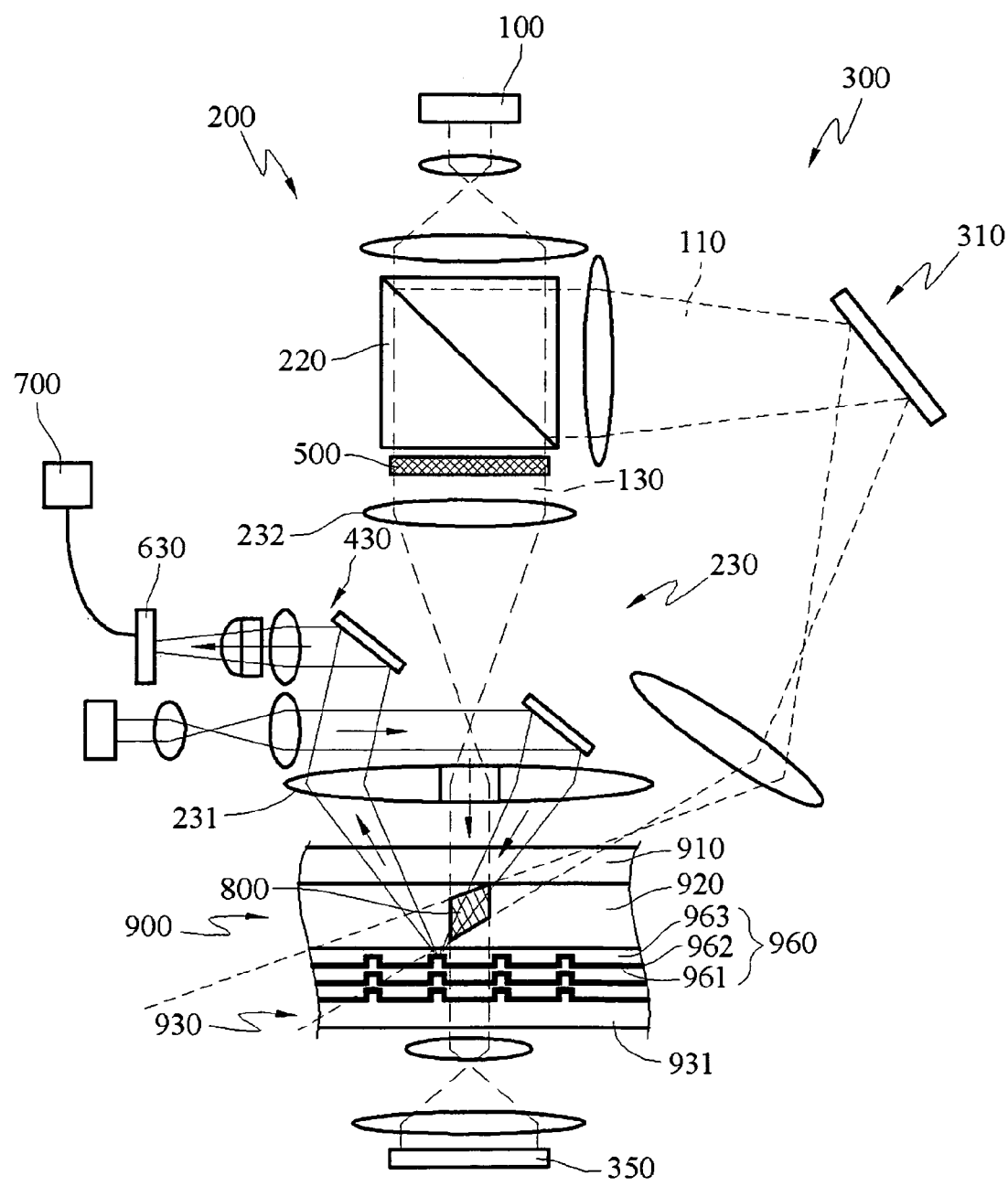
FIG. 12A is a schematic view of the combination of the tenth embodiment of the present invention.

FIG. 12A is a schematic view a tenth embodiment of the present invention is shown. The light source 100 generates coherence light. The coherence light is split into a reference beam 110 and a signal beam 130 after passing through the first light guiding portion 200. The signal beam 130 is projected to the holographic storage media 900 in a first incidence direction through the first light guiding portion 200, wherein the first incidence direction is a direction perpendicular extending into the holographic storage media 900 in this embodiment. Before the signal beam 130 is projected to the holographic storage media 900, it is projected to the SLM 500, such that the signal beam 130 is modulated by the SLM 500 and then projected to the holographic storage media 900. The reference beam 110 is projected to the holographic storage media 900 in a second incidence direction through a second light guiding portion 300 to be. The reference beam 110 and the signal beam 130 interfere with each other in the recording layer 920 of the holographic storage media 900, and then a holographic interferogram 800 is generated, which is recorded in the recording layer 920 of the holographic storage media 900.

Figure 12B:
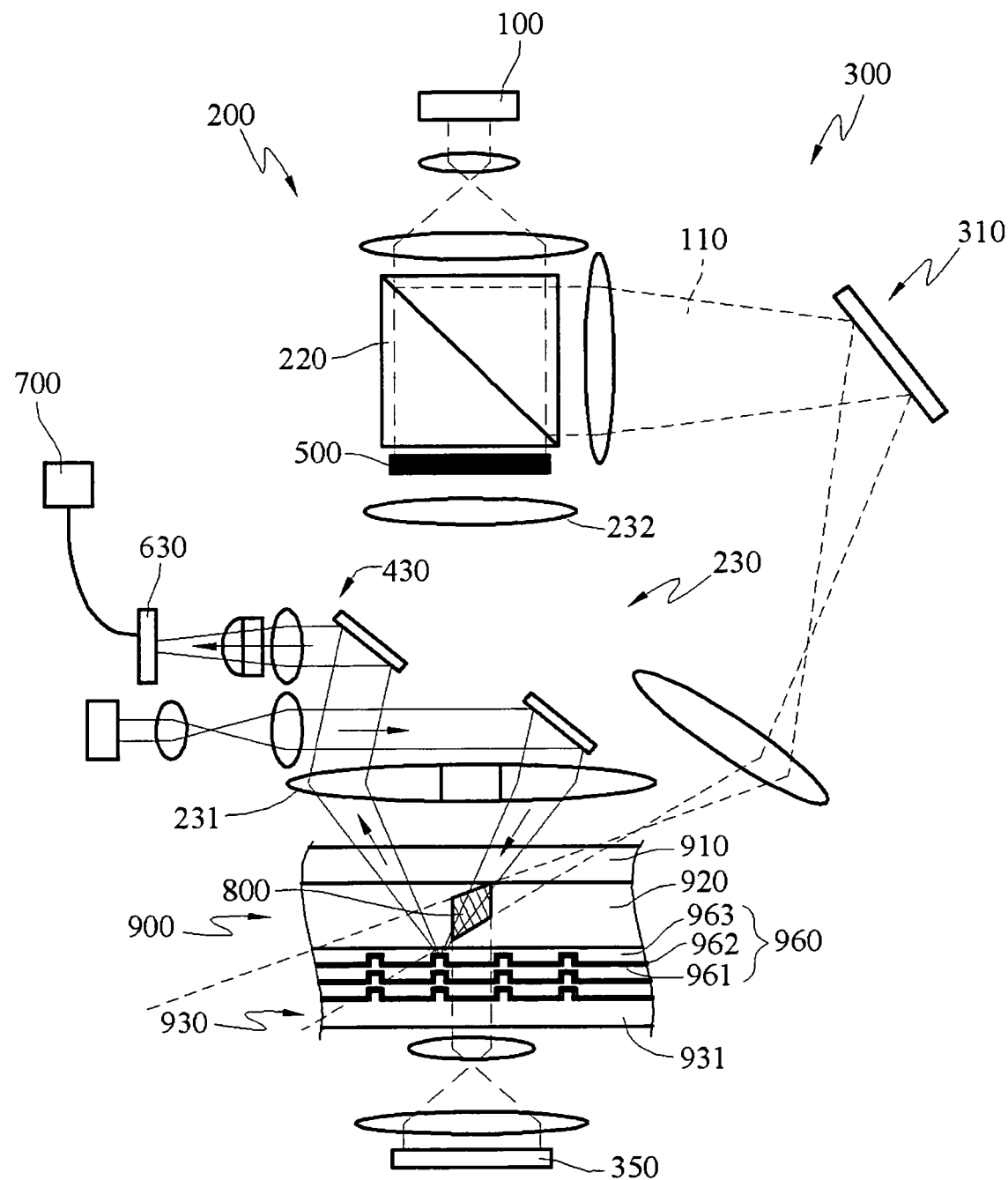
FIG. 12B is a schematic view of the reproduction of the tenth embodiment of the present invention.

FIG. 12B is a schematic view the tenth embodiment of the present invention, showing the system reproducing holographic interferogram. When the reference beam 110 is projected to the holographic interferogram 800 along the second incidence direction again, a reproducing beam 150 is generated. The reproducing beam 150 passes through the holographic storage media 900 and is projected to a two-dimensional image sensor 350 to be analyzed.

The system further comprises a servo light source 400 for generating a servo beam 410. The servo beam 410 is projected to the servo track 961 of the holographic storage media 900 through a servo beam guiding portion 420, and is modulated and reflected by the servo track 961, and then received by a sensing portion 600. Thus, the holographic interferogram 800 is continuously recorded in the recording layer 920 of the holographic storage media 900 along the servo track 961.

An objective lens set 230 is disposed in the path of the signal beam 130, such that when the signal beam 130 is projected to the objective lens set 230, it is then projected to the holographic storage media 900 as a appears as a parallel light. Therefore, the holographic interferogram 800 can be generated in the holographic storage media 900 in layers, that is, the holographic interferogram 800 can be generated in different layers of the holographic storage media 900. Therefore, when the relative position between the holographic storage media 900 and the interference position of the signal beam 130 and the reference beam 110 is adjusted, the holographic interferogram 800 can be generated on different layers of the holographic storage media 900, thus the capacity of the holographic storage media 900 is increased.

The system further comprises an optical servo for generating and reproducing holographic interferogram in different layers of the holographic storage media 900. Moreover, servo tracks 961 are also formed in layers in the holographic storage media 900, such that the holographic interferogram 800 is continuously formed in the holographic storage media 900 in different layers.

Therefore, the first light guiding portion 200 includes a splitter 220, for splitting the light from the light source 100 into a signal beam 130 and a reference beam 110. The signal beam 130 is projected to the holographic storage media 900 in a first incidence direction. The first incidence direction is a direction perpendicular extending into the holographic storage media 900. The second light guiding portion includes one or more lenses and one or more reflecting mirror sets to guide the reference beam 110, such the reference beam 110 is projected to the holographic storage media 900 in a second incidence direction. In this embodiment, the second incidence direction is a direction oblique extending into the holographic storage media 900.

The signal beam 130 is directly projected to the holographic storage media 900 after directly passing through the SLM 500; the applicable SLM 500 here is a transmissive SLM 500, such as a liquid crystal panel.

The objective lens set 230 is provided for transforms the signal beam 130 into a parallel light. The objective lens set 230 includes a objective lens 231 and a second objective lens 232, wherein the focus of the objective lens 231 coincides with that of the second objective lens 232, thus after the signal beam 130 passes through the SLM 500, it projected to the objective lens set 230, is then transformed into a parallel light beam. Also, the servo beam 410 is projected and converged by the objective lens 231 to the servo track 961 of the holographic storage media 900.

As the servo beam 410 and the signal beam 130 share the objective lens 231, and as the signal beam 130 uses the central area of the objective lens 231, while the servo beam 410 uses the peripheral area of the objective lens 231, the second objective lens 232 is provided for reducing the diameter of a beam to minimize the size of the objective lens 231. For the purpose, the focal length of the second lens 232 is longer than that of the objective lens 231, thus the diameter of the objective beam 130 generated by the splitter 220 is reduced.

Figure 13:
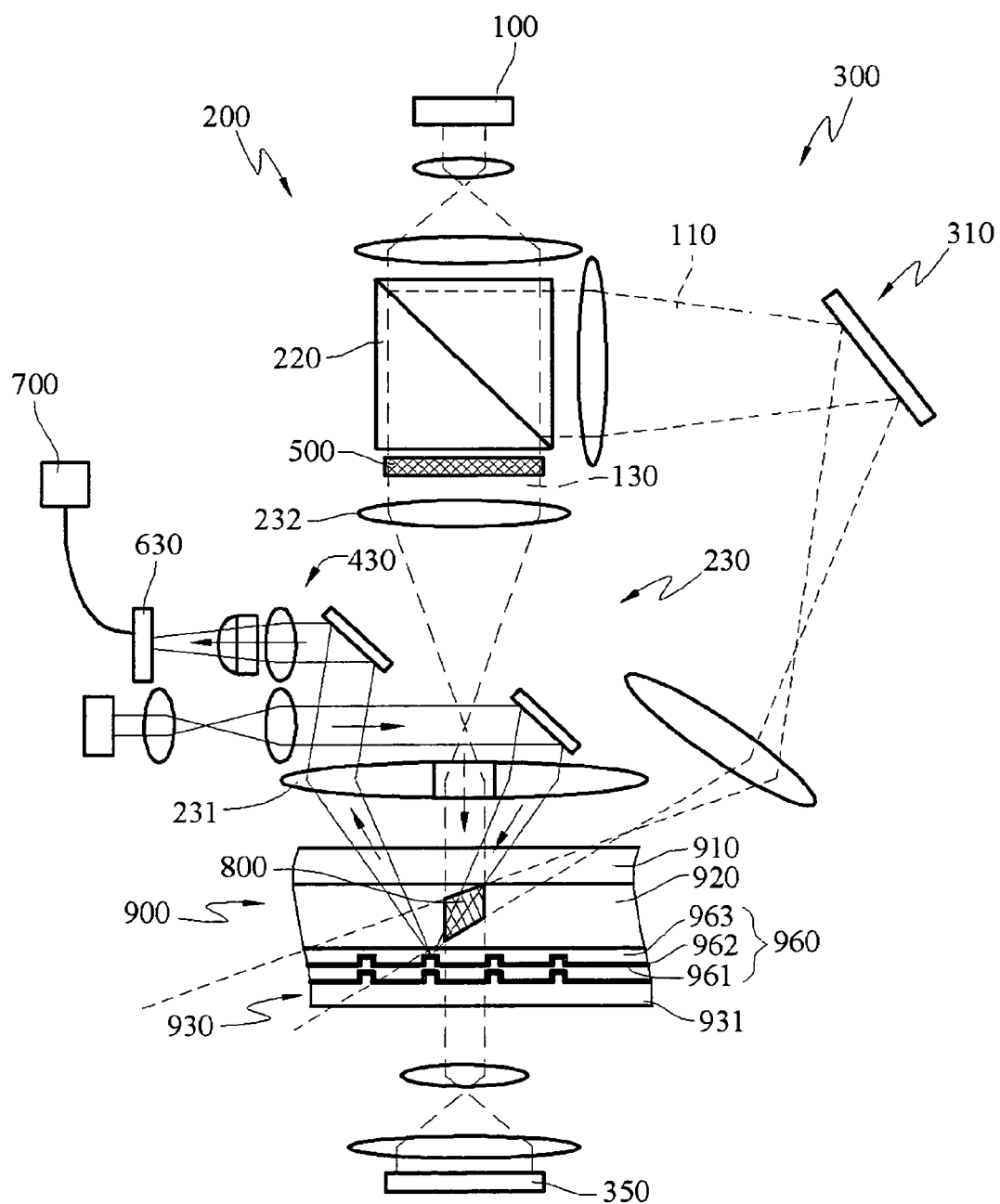
FIG. 13 is a schematic view of the combination of the eleventh embodiment of the present invention.

FIG. 13 is a schematic view of an eleventh embodiment of the present invention. The eleventh embodiment is similar to the tenth embodiment, but the servo tracks 961 are disposed in different layers of the holographic storage media 900. For instance, the servo layer 960 is disposed on the second substrate 930 and is adhered to the recording layer 920 in this embodiment, wherein the servo layer 960 has a plurality of servo tracks 961 disposed in layers.

Figure 14:
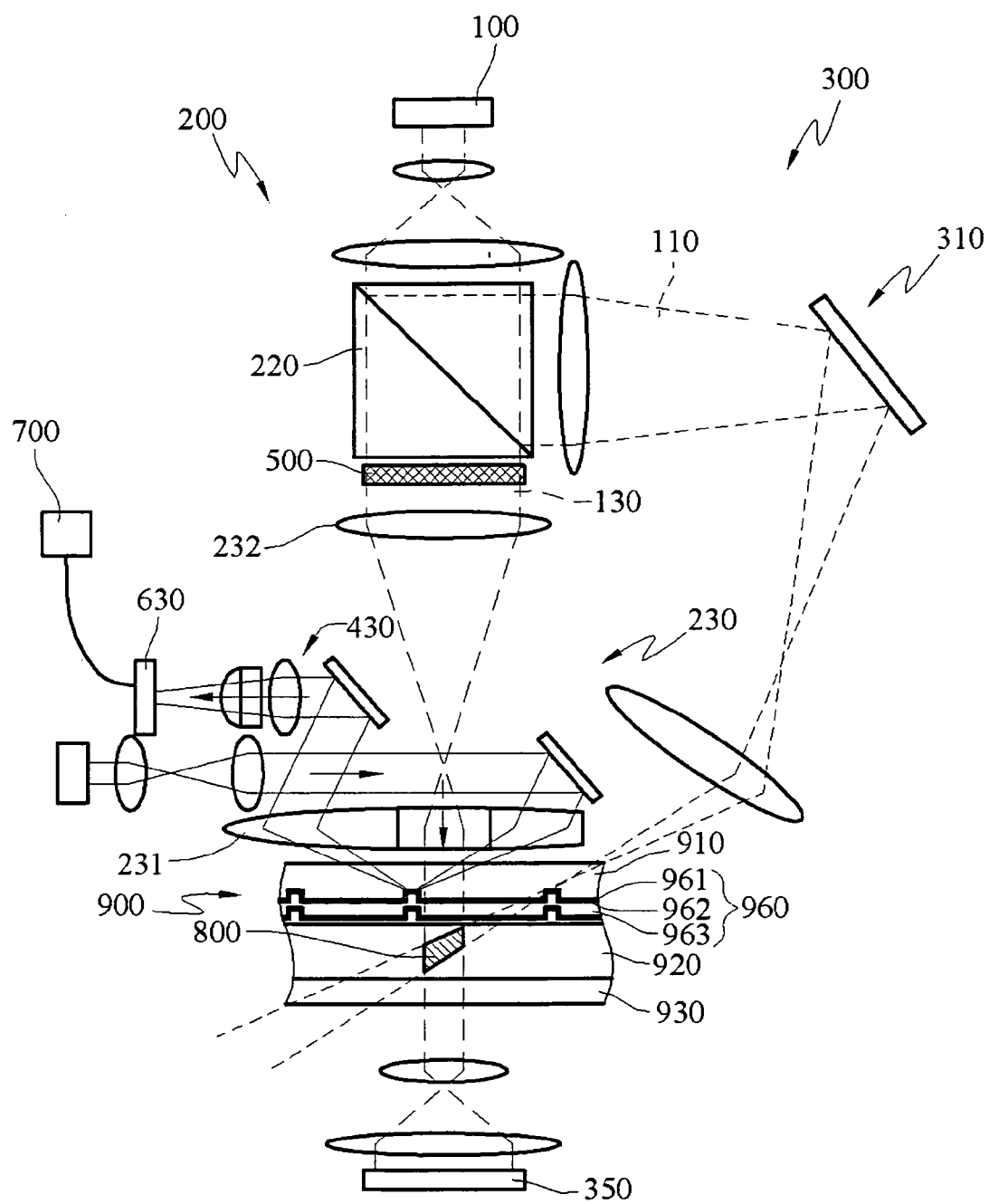
FIG. 14 is a schematic view of the combination of the twelfth embodiment of the present invention.

FIG. 14 is a schematic view a twelfth embodiment of the present invention. The twelfth embodiment is similar to the tenth embodiment, but the servo tracks 961 are disposed in different layers of the holographic recording 900. For instance, the servo layer 960 is disposed on the first substrate 910 on the side adhered to the recording layer 920, wherein the servo layer 960 has a plurality of servo tracks 961 disposed in layers.

Figure 15:
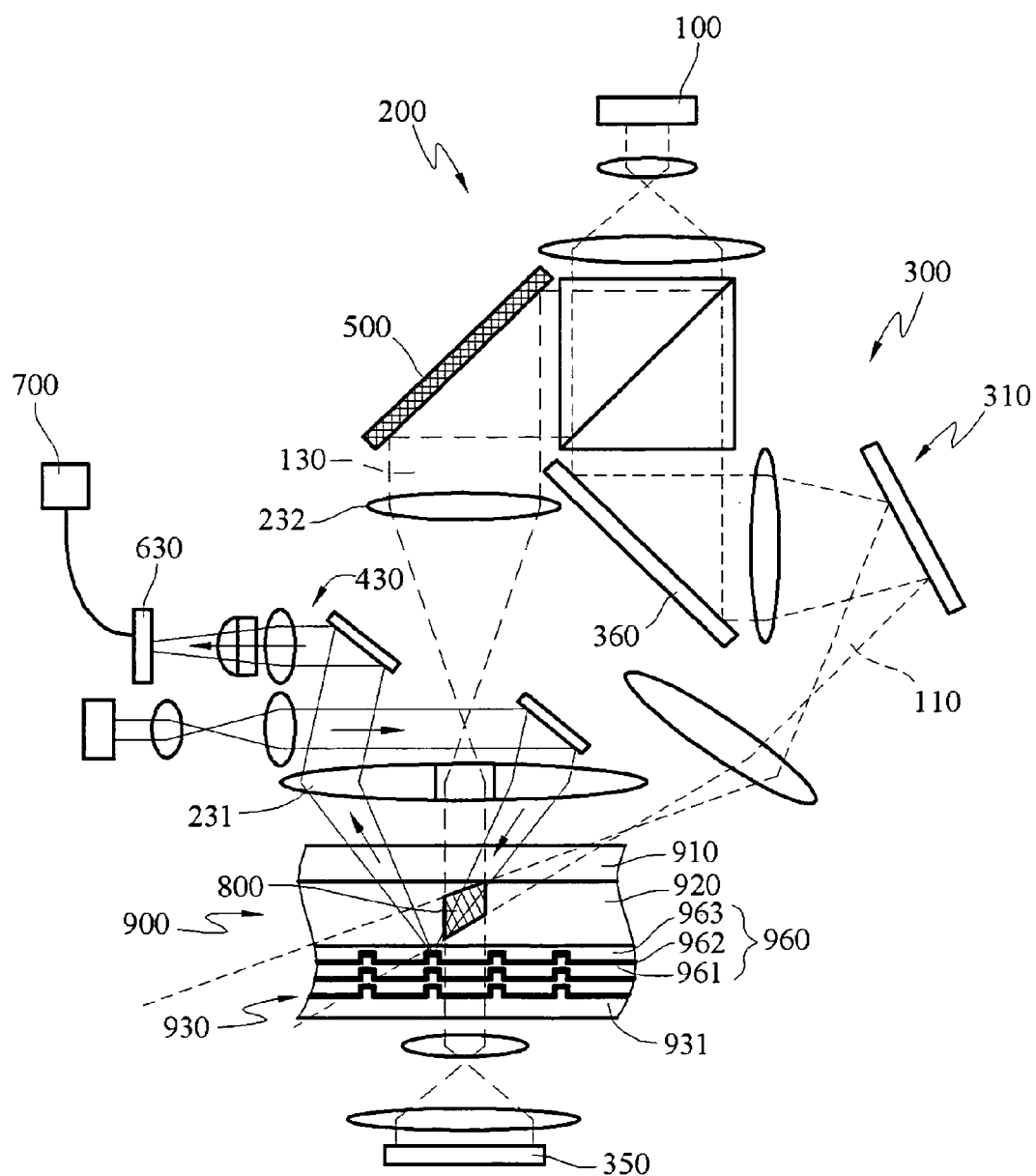
FIG. 15 is a schematic view of the combination of the thirteenth embodiment of the present invention.

FIG. 15 is a schematic view of a thirteenth embodiment of the present invention. The thirteenth embodiment is similar to the tenth embodiment. But in this embodiment, a reflective SLM 500, such as a digital micro mirror device (DMD), is adopted. Therefore, when the signal beam 130 is projected from one side of the splitter 220, it is projected to the reflective SLM 500. After the signal beam 130 is reflected and modulated, it is projected to the objective lens set 230. When the reference beam 110 is projected from one side of the splitter 220, it is reflected by a first reflecting minor 360 of the second light guiding portion 300, and is projected to the lenses and reflecting mirror sets 310.

Figure 16:
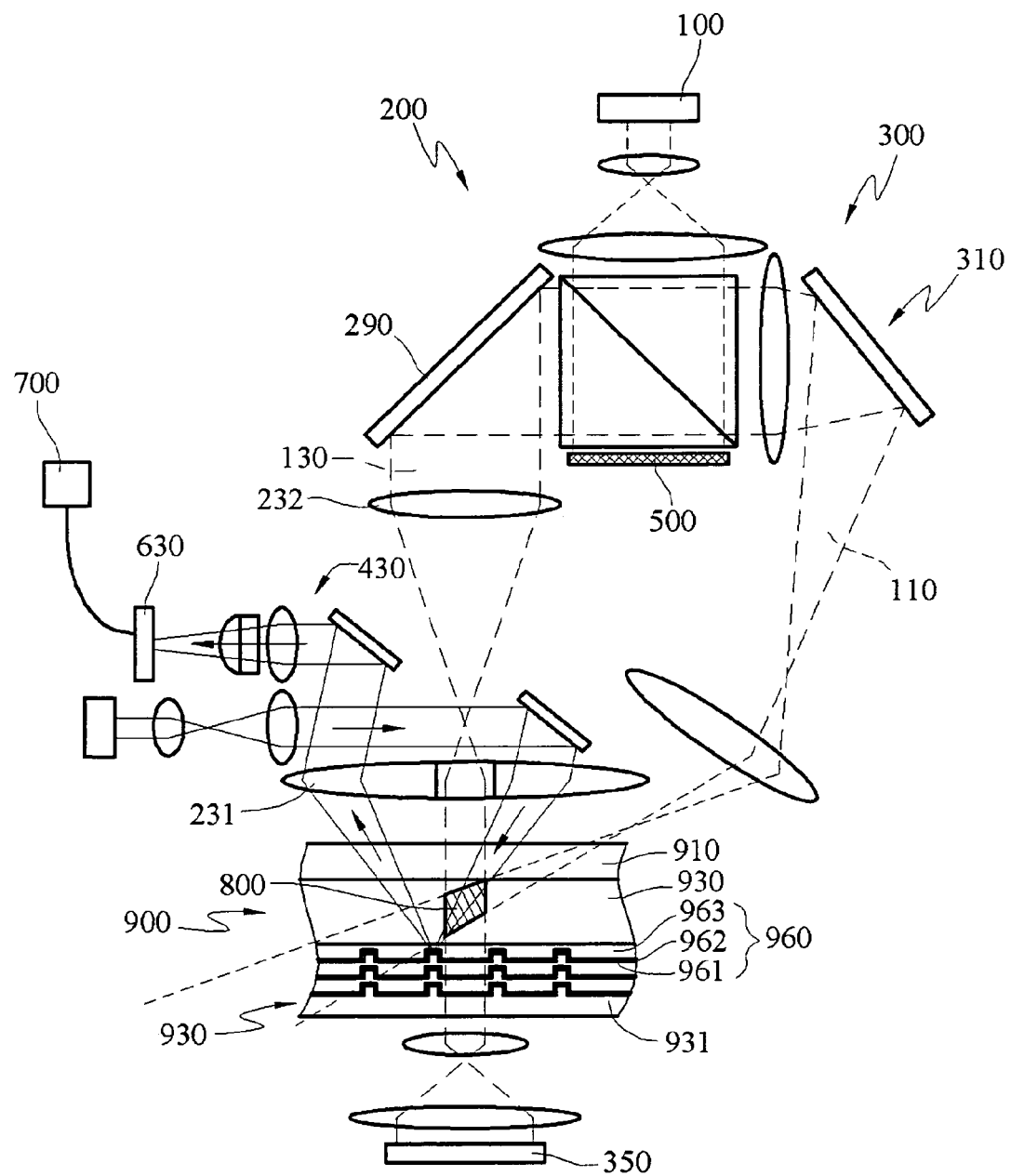
FIG. 16 is a schematic view of the combination of the fourteenth embodiment of the present invention.

FIG. 16 is a schematic view of a fourteenth embodiment of the present invention. The fourteenth embodiment is similar to the tenth embodiment. But in this embodiment, a reflective SLM 500, such as liquid crystal on silicon (LCOS), is adopted, such that when a light or a beam with P polarization is projected to the SLM 500 of this embodiment, it is converted by the SLM 500 from P polarization to S Polarization, and is then reflected by the SLM 500.

The first light guiding portion 200 in this embodiment is modified accordingly. The first light guiding portion 200 includes a signal beam reflecting mirror 290 and a polarizing splitter 220. The polarizing splitter 220 splits the incidence light from the light source 100 into a signal beam 130 and a reference beam 110. The signal beam reflecting mirror 290 is disposed on one side of the polarizing splitter 220. After the signal beam 130 is projected to the SLM 500, the polarization of the signal beam 130 is converted by the SLM 500, and the signal beam 130 is reflected by the SLM 500. After that, the signal beam 130 is reflected by the polarizing splitter 220 and is projected to the signal beam reflecting mirror 290. The signal beam reflecting mirror 290 reflects the signal beam 130 to be projected to the objective lens set 230 and then projected to the holographic storage media 900 in the first incidence direction.

And the second light guiding portion 300 includes one or more lenses and one or more reflecting mirror sets for changing the direction of the reference beam 110, such that the reference beam 110 is projected to the holographic storage media in the second incidence direction.

Figure 17:
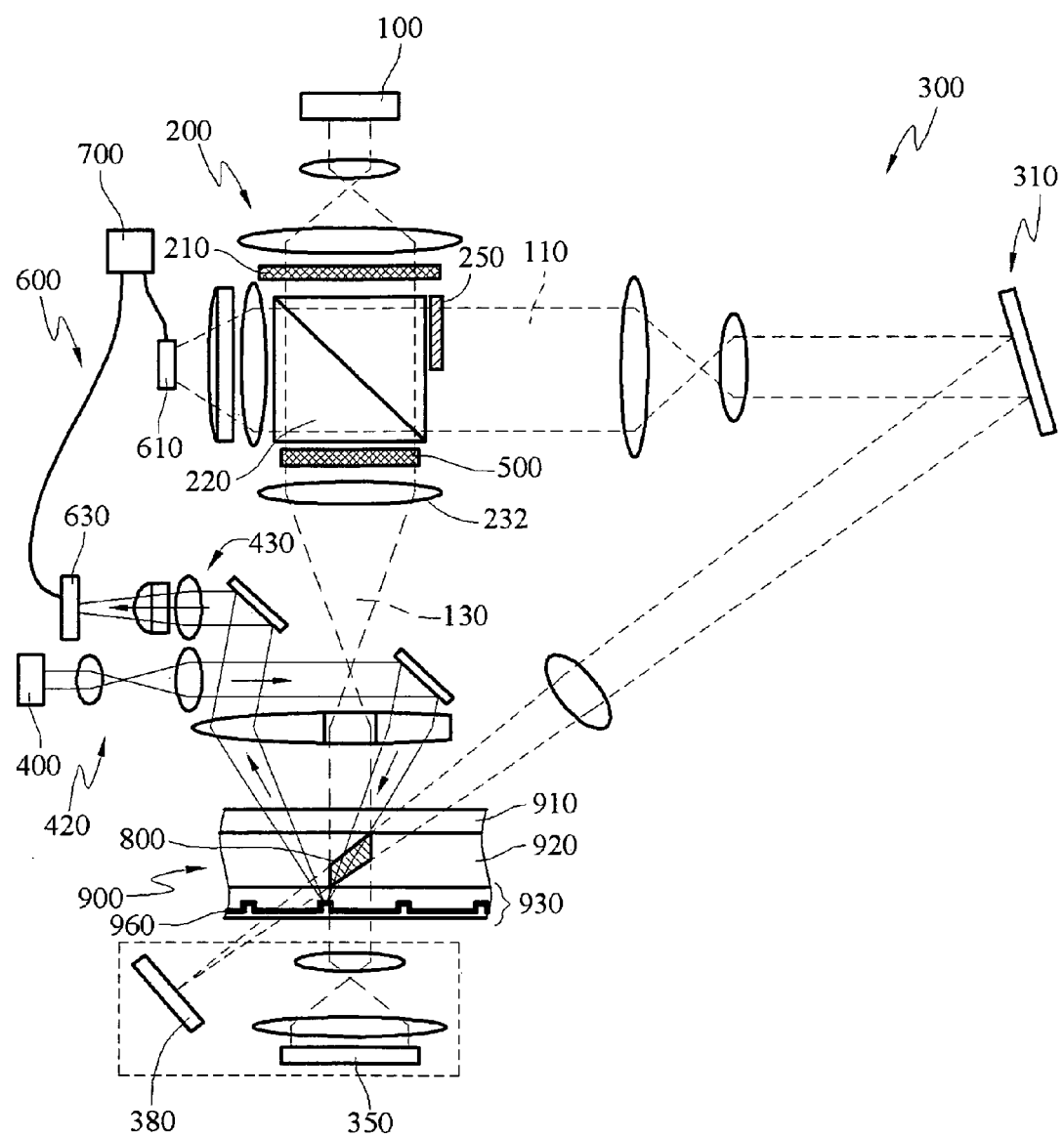
FIG. 17 is a schematic view of the combination of the fifteenth embodiment of the present invention.

FIG. 17 is a schematic view of a fifteenth embodiment of the present invention. The fifteenth embodiment is similar to the tenth embodiment. But the first light guiding portion 200 further includes a polarizing film 210, and the second light guiding portion 300 further includes a first phase delay film 250 and a second reference beam reflecting mirror 380. The first phase delay film 250 does not completely cover the splitter 220, but instead of covering a half of the splitter 220. The second reference beam reflecting mirror 380 is facing the second incidence direction. The reference beam 110 is converged by the lenses and reflecting mirror sets 310 and then focuses on a second reference beam reflecting mirror 380. After the reference beam 110 passes through the holographic storage media 900, it is reflected by the second reference beam reflecting mirror 260 and travels back along the original path. Then it is projected to the splitter 220 and then projected to a reference beam sensor 610 disposed on one side of the splitter 220, thereby the position and the incident angle of the optical system under the holographic storage media 900 can be exactly controlled. The light from the light source 100 first passes through the polarizing film 210, and is converted to a linear polarization light. Half of the reference beam 110 passes through the first phase delay film 250, such that the polarization state of the half of the reference beam 110 is changed. Therefore, when the reference beam 110 is reflected by the second reference beam reflecting mirror 380 and travels back along the original path, the interference can be avoided and will not be recorded in the holographic storage media 900.

Figure 18A:
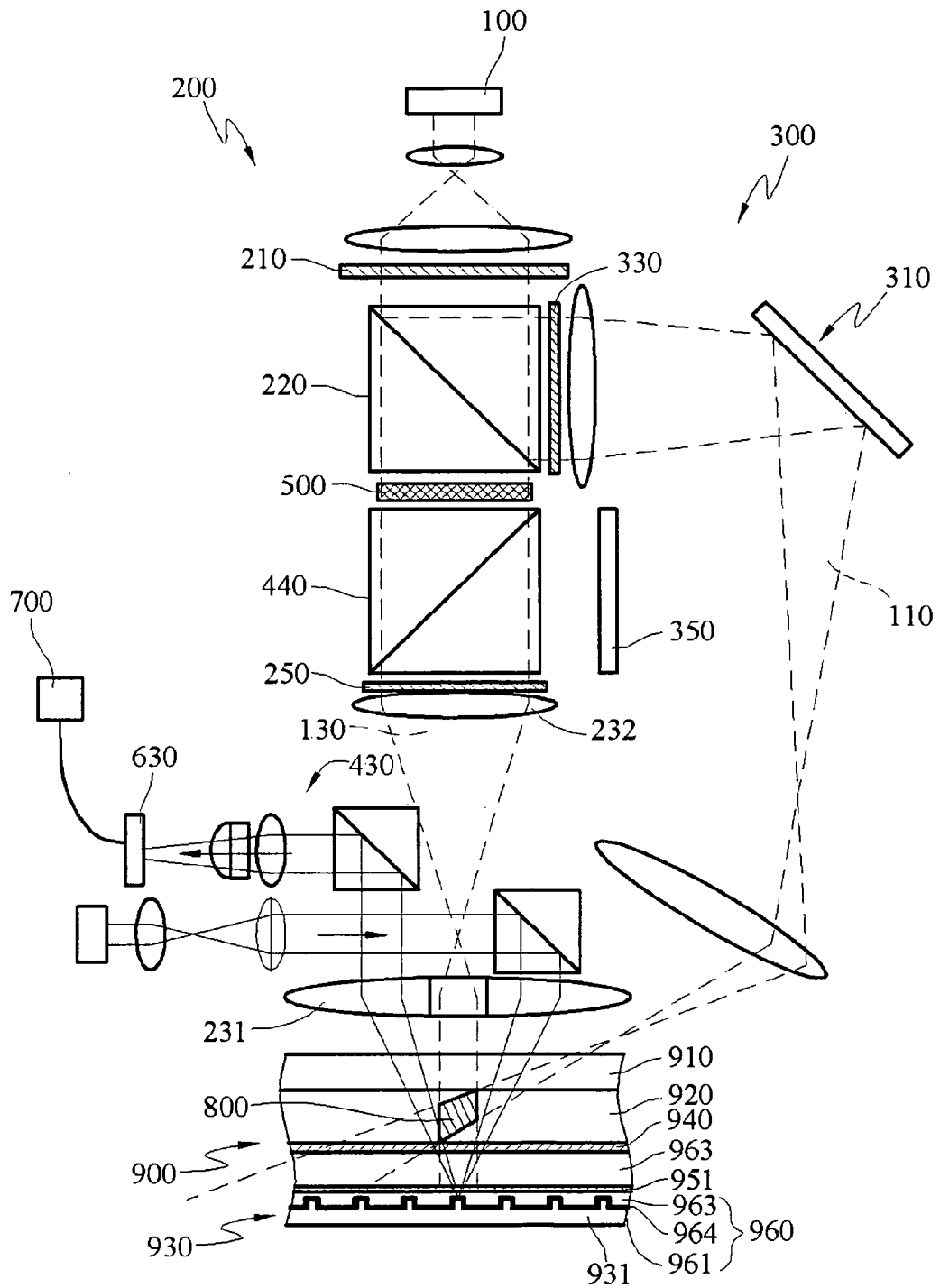
FIG. 18A is a schematic view of the combination of the sixteenth embodiment of the present invention.
Figure 19:
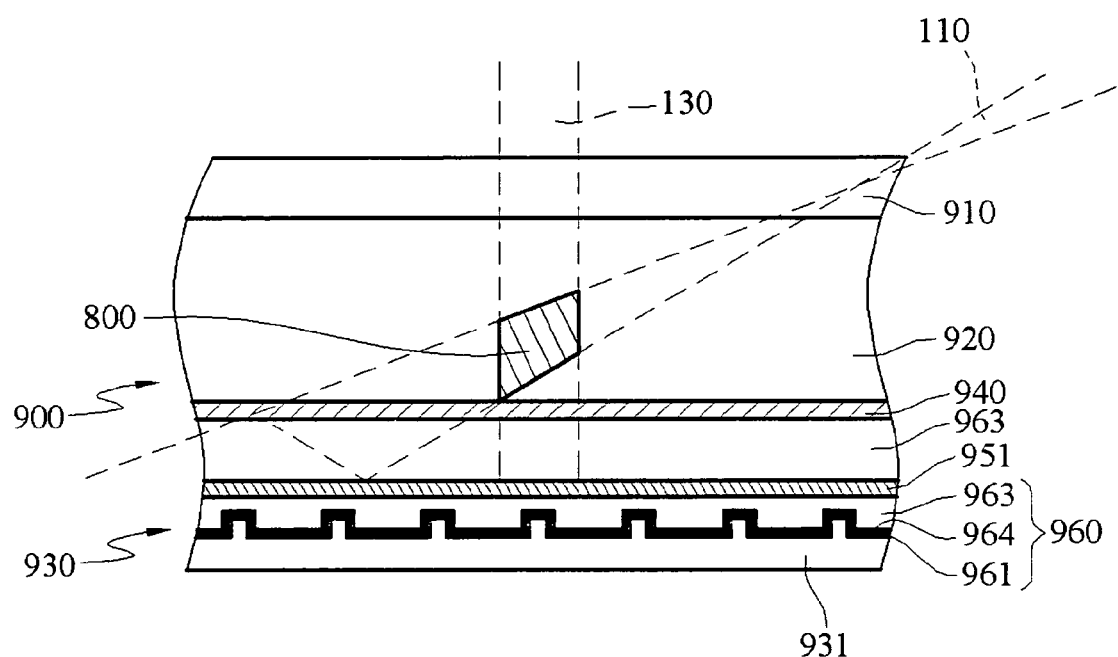
FIG. 19 is a schematic view of the interference of the signal beam and the reference beam of the sixteenth embodiment of the present invention.

FIG. 18A is a schematic view of a sixteenth embodiment of the present invention. FIG. 19 is a schematic view showing the interference of the signal beam and the reference beam of the sixteenth embodiment of the present invention. This embodiment adopts a reflective holographic storage media 900. Therefore, a wavelength selection film layer 951 that reflects the signal beam 130 and allows the servo beam 130 to pass through and a servo track reflection layer 964 that reflects the servo beam 410 are disposed in the second substrate 930 of the holographic storage media 900.

Therefore, the system of the sixteenth embodiment comprises a light source 100 for generating a light. The light is projected to a first light guiding portion 200, and is then split into a signal beam 130 and a reference beam 110. The signal beam 130 is projected to a SLM 500 through a first light guiding portion 200, and then the signal beam 130 is projected to the holographic storage media 900 in a first incidence direction. The reference beam 110 is projected to the holographic storage media 900 in a second incidence direction through a second light guiding portion 300. In this embodiment, the second incidence direction is a direction oblique extending into the holographic storage media 900, and the first incidence direction is a direction perpendicular extending into the holographic storage media 900.

A polarizing film 210 is located in front of the light source 100 to polarize the light generated by the light source 100 into a polarization light, that is, a linear polarization light. The polarization light is polarized to a direction parallel to the paper, which is referred to as P polarization. If the polarization direction is perpendicular to the paper, it is referred to as S polarization. After the light of the light source 100 passes through the polarizing film 210, it becomes a linear polarization light with P polarization. The linear polarization light is then split into the signal beam 130 and the reference beam 110 through the splitter 220, such that the signal beam 130 and the reference beam 110 are both P polarization light.

The second light guiding portion 300 includes a lens and reflecting mirror set with one or more lenses and one or more reflecting mirror sets for changing the direction of the reference beam 110, such that the reference beam 110 is projected to the holographic storage media 900 in the second incidence direction. Thus, the signal beam 130 and the reference beam 110 interferes with each other in the holographic storage media 900 to generate the holographic interferogram 800.

Figure 18B:
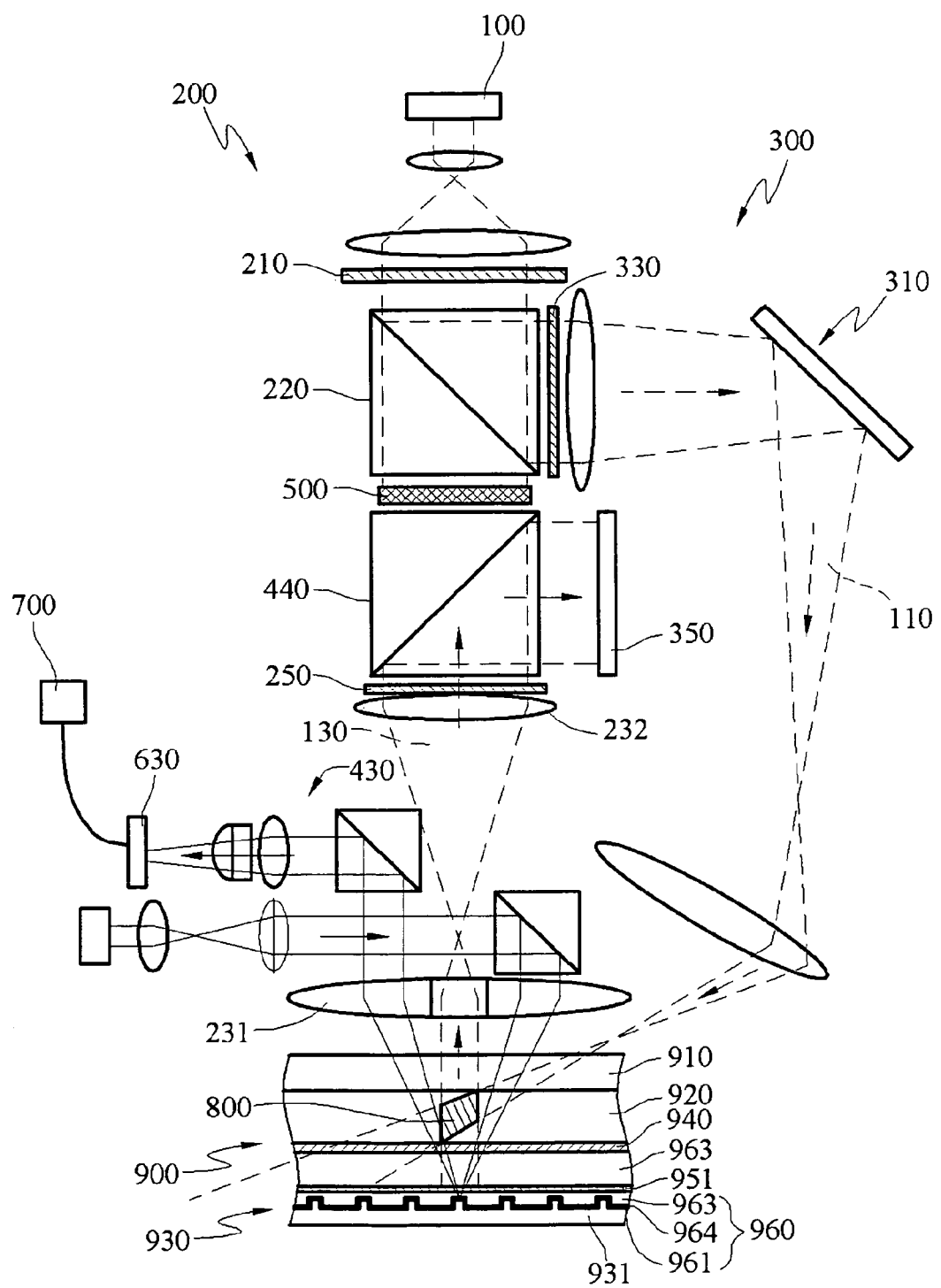
FIG. 18B is a schematic view of the reproduction of the sixteenth embodiment of the present invention.

FIG. 18B is a schematic view the sixteenth embodiment of the present invention, showing the system reproducing holographic interferogram. During the system reproducing, the reference beam 110 is projected to the holographic interferogram 800, a reproducing beam 150 is generated. The reproducing beam 150 is reflected by the holographic storage media 900. A polarizing splitter 440 is used to obtain the reproducing beam 150. A first phase delay film 250 is further disposed in the first light guiding portion 200. The first phase delay film 250 is located on the path of the signal beam 130, such that the signal beam 130 is projected to the first phase delay film 250 after being projected to the SLM 500, and the polarization of the signal beam 130 is converted to S polarization, and then is projected to the holographic storage media 900. A second phase delay film 330 is disposed in the second light guiding portion 300. The second phase delay film 330 is located on the path of the reference beam 110, such that the polarization of the reference beam 110 is converted to S polarization, which is the same as that of the signal beam 130. The reference beam is then projected to the holographic storage media 900, and interferes with the signal beam 130 to generate the holographic interferogram 800.

The system of the sixteenth embodiment further comprises a servo beam guiding portion 420 including a servo beam reflecting mirror set 430 and a fourth polarizing splitter 440. The direction of a servo beam 410 is changed by the servo beam reflecting mirror set 430, and then the servo beam 410 is projected to a objective lens 231. The servo beam 410 is converged by the objective lens and then projected the holographic storage media 900. In the holographic storage media 900, the servo beam 410 passes through a wavelength selection film 951 of the holographic storage media 900 to be projected to the servo track 961 of the holographic storage media 900. The servo track 961 then reflects the servo beam 410, and the servo beam 410 is then projected to a servo beam sensor 630 of a sensing portion 600 through the servo beam reflecting mirror set 430, such that the servo beam 410 is converted to an electrical signal. The electrical signal is transmitted to the controlling device 700, such that the holographic interferogram 800 is continuously recorded in the holographic storage media 900 along the servo track 961.

A fourth polarizing splitter 440 is disposed between the splitter 220 and the first phase delay film 250, such that a reproducing beam 150 is generated when the reference beam 110 with the S polarization is projected to the holographic interferogram 800 during the system reproducing. The reproducing beam 150 is also with the S polarization. The reproducing beam 150 will pass through the first phase delay film 250 and changes the polarization to P polarization, such that the reproducing beam 150 cannot be split by the fourth polarizing splitter 440. Therefore, a fifth phase delay film 940 is further disposed in the second substrate 930 of the holographic storage media 900. The fifth phase delay film 940 is a ¼ wavelength film for converting the polarization of a light from P polarization to S polarization, after passing the fifth phase delay film 940 twice. Therefore, when the reproducing beam with the P polarization is projected to the fifth phase delay film 940 of the holographic storage media 900 and then is reflected and passes through the fifth phase delay film 940 again, the polarization is converted to the S polarization. When the reproducing beam 150 with P polarization is projected to the fourth polarizing splitter 440, it is reflected by the fourth polarizing splitter 440 and is projected to the two-dimensional image sensor 350.

Figure 20:
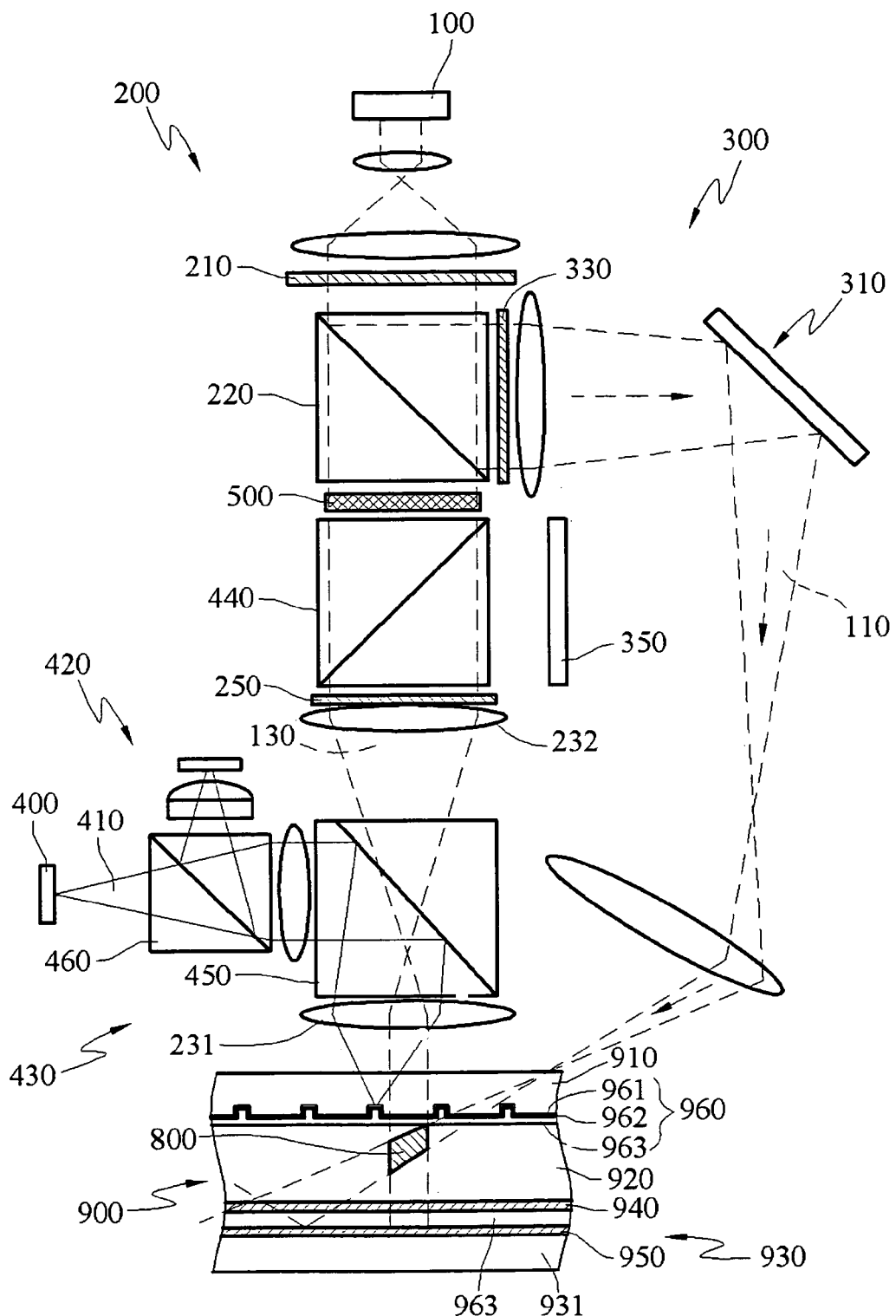
FIG. 20 is a schematic view of the combination of the seventeenth embodiment of the present invention.
Figure 21:
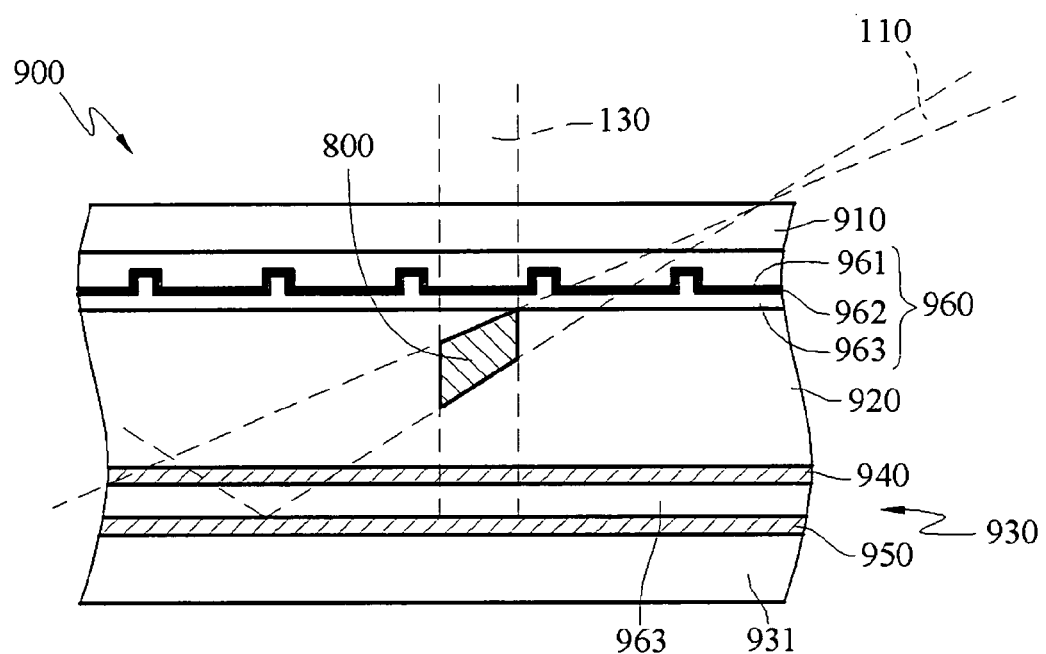
FIG. 21 is a schematic view of the interference of the signal beam and the reference beam of the seventeenth embodiment of the present invention.

FIG. 20 is a schematic view of a seventeenth embodiment of the present invention. FIG. 21 is a schematic view showing the interference of the signal beam and the reference beam of the seventeenth embodiment of the present invention. The seventeenth embodiment is similar to the sixteenth embodiment, but has a different servo beam guiding portion. The servo beam guiding portion of the seventeenth embodiment includes a fourth polarizing splitter 440, a dichroic prism splitter 450, and a second splitter 460. The fourth polarizing splitter 440 is disposed between the splitter 220 and the first phase delay film 250, such that the reference beam 110 is projected to the holographic interferogram to generate the reproducing beam 150. The reproducing beam 150 is projected to the fourth phase delay film 270 of the holographic storage media, and the polarization of the reproducing beam 150 is converted, and then the reproducing beam 150 is reflected back to be projected to the fourth polarizing splitter 440. Then the reproducing beam 150 is reflected by the fourth polarizing splitter 440 to be projected to the two-dimensional image sensor 350. The dichroic prism splitter 450 is used for splitting lights of different wavelengths. The servo beam is reflected by the dichroic prism splitter 450 to be projected to the servo track 961 of the holographic storage media. The servo beam 410 is reflected by the servo track 961 to be projected to the dichroic prism splitter 450, and then is reflected by the dichroic prism splitter 450 to be projected to the second splitter 460 disposed on one side of the dichroic prism splitter 450. Finally, the servo beam 410 is reflected by the dichroic prism splitter 450 to be projected to the servo beam sensor 630 of the sensing portion 600. Thereby, the servo beam 410 is converted to an electrical signal transmitted to the controlling device 700, such that the holographic interferogram 800 is continuously recorded in the holographic storage media 900 along the servo track 961 through the controlling device 700.

Figure 22:
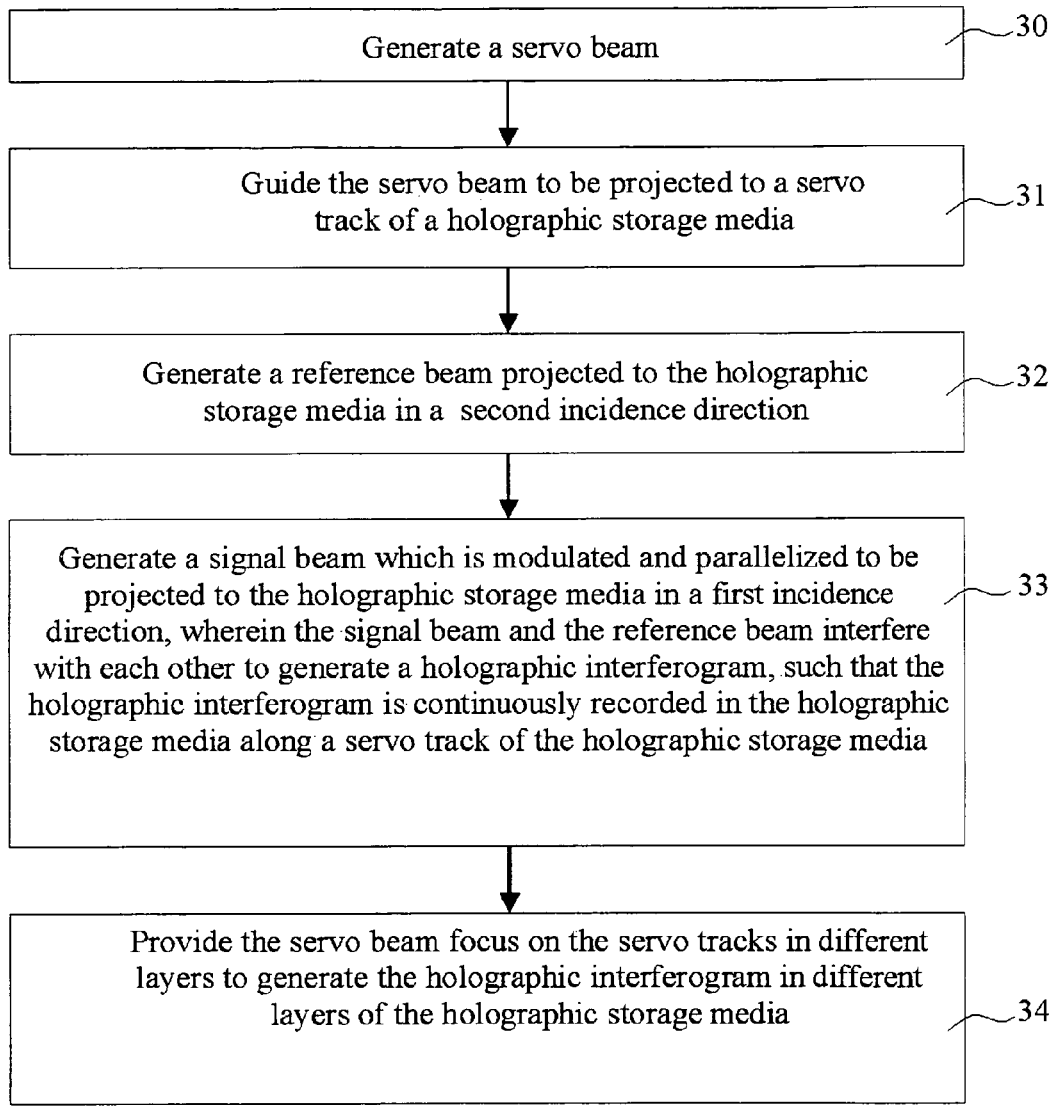
FIGS. 22, 23, 24 and 25 are flow charts of the method of the present invention.

FIG. 22 is a flow chart of the present invention. A method for recording and reproducing holographic storage is of the invention is provided, which comprises the following steps.

Firstly, generate a servo beam (Step 30) and guide the servo beam to be projected to a servo track of a holographic storage media (Step 31). Then, generate a reference beam when the servo beam falls on a predetermined data address. The reference beam is projected to the holographic storage media in a second incidence direction (Step 32). Generate a signal beam which is modulated and parallelized, such that the signal beam is a parallel light projected to the holographic storage media in a first incidence direction, and interferes with the reference beam to generate a holographic interferogram, and the holographic interferogram is continuously recorded in the holographic storage media along a servo track of the holographic storage media (Step 33).

Furthermore, if the holographic storage media has a plurality of servo tracks formed in different layers, provide the servo beam focus on the servo tracks in different layers to generate the holographic interferogram in different layers of the holographic storage media (Step 34).

Figure 23:
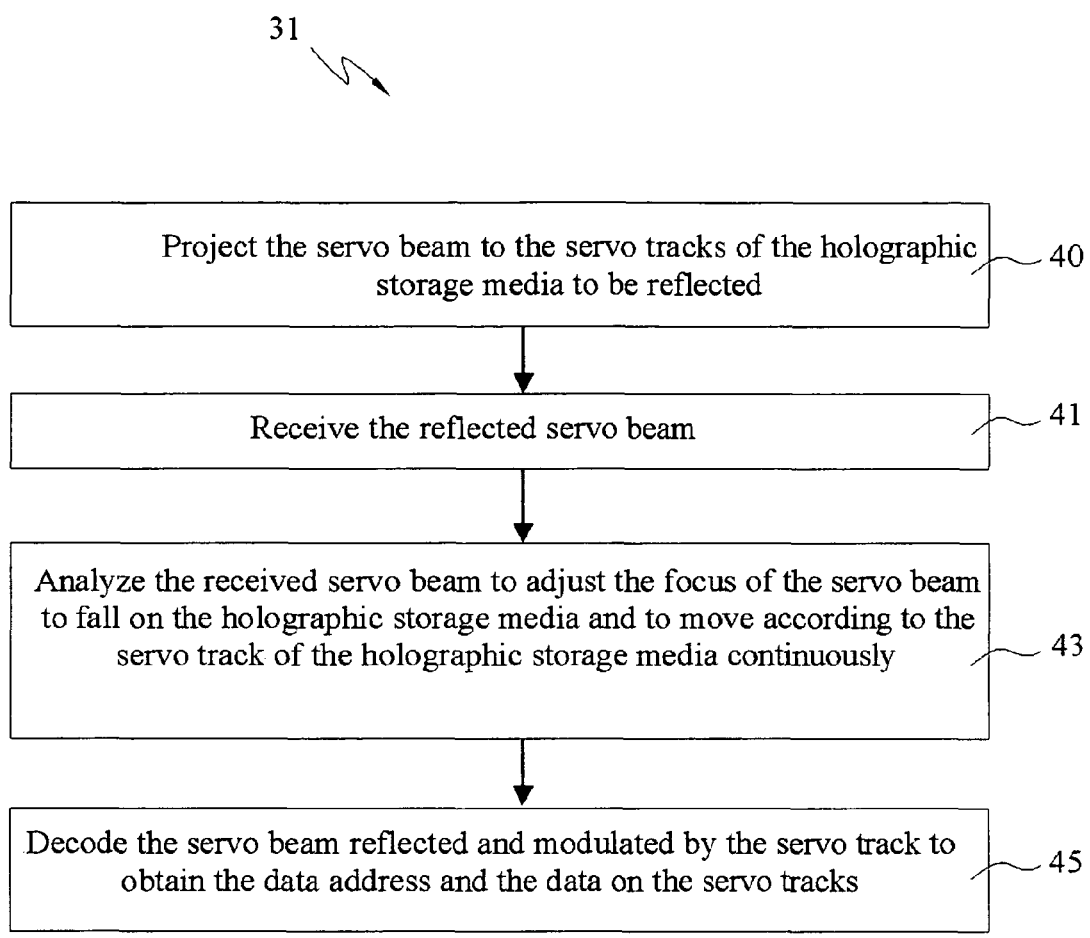

Referring to FIG. 23, for guiding the servo beam to be projected to the servo track of the holographic storage media (Step 31), the following steps are included. First, project the servo beam to the servo tracks of the holographic storage media to be reflected (Step 40). Receive the reflected servo beam by a sensor (Step 41). Analyze the received servo beam to adjust the system, such that the focus of the servo beam falls on the holographic storage media and moves along the servo track continuously (Step 43). Decode the servo beam reflected and modulated by the servo track to obtain the data address and the data on the servo tracks (Step 45).

Figure 24:
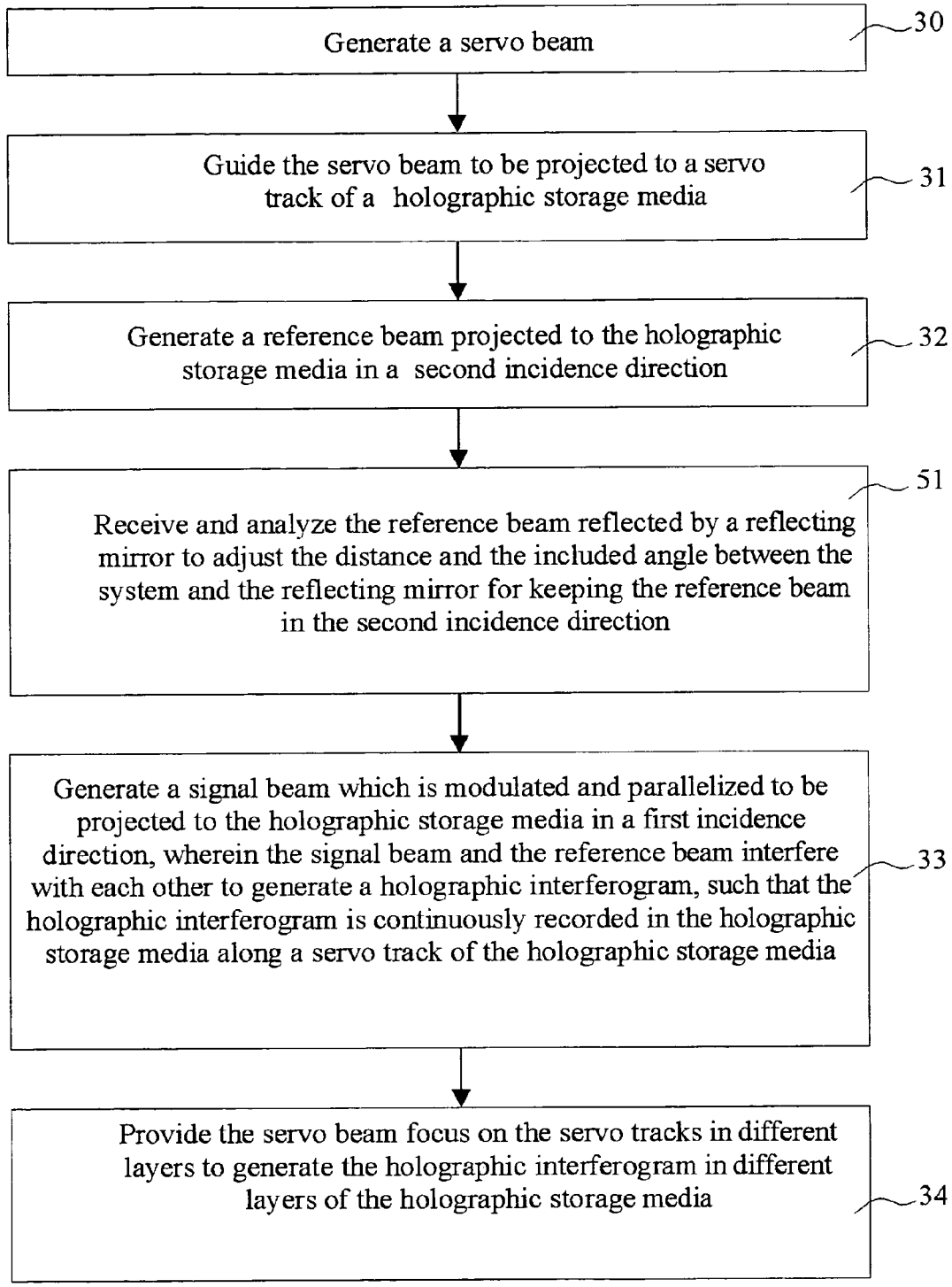

Furthermore, referring to FIG. 24, after the step of projecting the reference beam to the holographic storage media in the second incidence direction (Step 32), receive and analyze the reference beam reflected by a reflecting mirror to adjust the distance and the incident angle between the system and the reflecting mirror again, for keeping the reference beam in the second incidence direction to be projected to the holographic storage media (Step 51).

Figure 25:
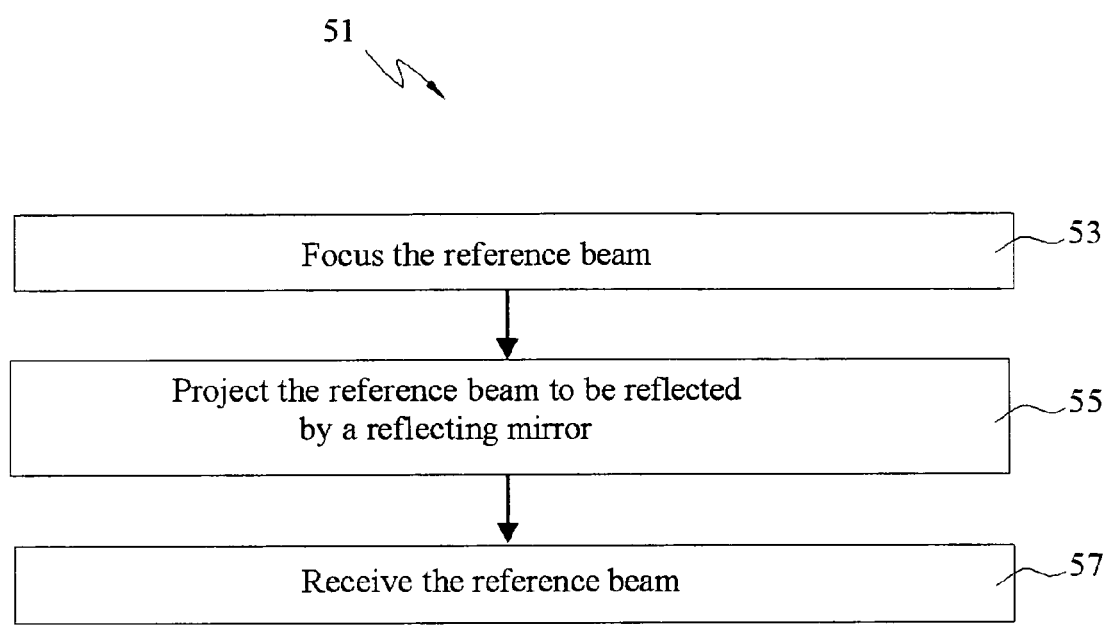

Referring to FIG. 25, the step of reflecting and receiving the reference beam (Step 51) includes the following steps. Focus the reference beam (Step 53), and then project the reference beam to a reflecting mirror, such that the reference beam is reflected by the reflecting mirror and travels back along the original path (Step 55), such that the reference beam sensor receives the reference beam (Step 57).

Therefore, the present invention provides various practical systems and methods for recording and reproducing holographic storage which has an optical servo to increase the storage capacity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A system for recording and reproducing a holographic interferogram on a holographic storage medium with an optical servo, comprising:

a light source generating a signal beam and a reference beam, the reference beam being projected to the holographic storage medium in a first incidence direction, and the signal beam being projected to the holographic storage medium in a second incidence direction;

a spatial light modulator and an image sensor on the path of the signal beam, such that the signal beam passes through the spatial light modulator to reach the holographic storage medium, and interferes with the reference beam to generate the holographic interferogram in the holographic storage medium, and when the reference beam is projected to the holographic interferogram in the first incidence direction again, a reproducing beam is generated and is projected to the image sensor;

a reflecting mirror reflecting the reference beam passing through the holographic storage medium;

a reference beam sensing portion receiving the reflected reference beam and converting the reflected reference beam into a first electrical signal;

a servo beam guiding portion guiding the reference beam to pass through the holographic storage medium, and guiding the reflected reference beam the reference beam sensing portion;

a servo light source generating a servo beam, the servo beam being projected to a servo track of the holographic storage medium through the servo beam guiding portion, and being reflected by the servo track;

a servo sensing portion receiving the reflected servo beam and converting the reflected servo beam to a second electrical signal; and a controlling device analyzing the first and second electrical signals, so as to adjust a distance and an incident angle between the reflecting mirror and the reference beam to ensure that the reference beam is projected to the holographic storage medium in the first incidence direction, and to ensure that the holographic interferogram is continuously recorded in the holographic storage medium along the servo track.

2. The system for recording and reproducing a holographic interferogram on a holographic storage medium with an optical servo as claimed in claim 1, further comprising a first light guiding portion and a second light guiding portion, wherein the first light guiding portion is disposed in front of the light source, such that the light generated by the light source, after passing through the first light guiding portion, is split into the signal beam and the reference beam, and the reference beam is projected to the holographic storage medium in the first incidence direction through the first light guiding portion; and the second light guiding portion guides the signal beam to be projected to the spatial light modulator and then to be projected to the holographic storage medium in the second incidence direction.

3. The system for recording and reproducing a holographic interferogram on a holographic storage medium with an optical servo as claimed in claim 2, wherein the first light guiding portion comprises:

a polarizing film, disposed in front of the light source, such that the light projected by the light source is converted to a linear polarization light after passing through the polarizing film;

a splitter, for splitting the linear polarization light projected to the splitter into the signal beam and the reference beam, wherein the reference beam is projected to the holographic storage medium in the first incidence direction;

an objective lens, for converging the reference beam and then projecting the reference beam to the holographic storage medium; and the second light guiding portion comprises:

at least one lens and at least one reflecting mirror sets, for changing the direction of the signal beam after the signal beam is projected to the spatial light modulator, such that the signal beam is projected to the holographic storage medium in the second incidence direction.

4. The system for recording and reproducing a holographic interferogram on a holographic storage medium with an optical servo as claimed in claim 3, wherein the first light guiding portion further comprises a second objective lens, and the second objective lens includes:

a first lens; and a second lens with a focus coinciding with a focus of the first lens, and having a focal length shorter than that of the first lens, such that the diameter of the reference beam generated by the splitter is reduced.

5. The system for recording and reproducing a holographic interferogram on a holographic storage medium with an optical servo as claimed in claim 3, wherein the first light guiding portion further comprises:

a first phase delay film, disposed on one side of the splitter, such that the reference beam is projected to the first phase delay film and the polarization of the reference beam is converted; and a reflecting mirror with a third phase delay film adhered to one side of the reflecting mirror, wherein the reference beam passes through the holographic storage medium and is projected to the third phase delay film, and is reflected by the reflecting mirror to pass through the third phase delay film again, such that the polarization of the reference beam is converted, and the reference beam, after being projected to the splitter, is projected to the reference beam sensing portion, and for analyzing and adjusting the distance and the incident angle between the reflecting mirror and the reference beam; and the second light guiding portion further comprises:

a second phase delay film, disposed on the path of the signal beam, wherein the signal beam is projected to the second phase delay film again after being projected to the spatial light modulator, such that the polarization of the signal beam is converted to be the same as that of the reference beam, and thus the holographic interferogram is generated when the reference beam and the signal beam interfere with each other in the holographic storage medium; and a first polarizing splitter, wherein when the reference beam is projected to the holographic interferogram, a reproducing beam is generated, and then is projected to the second phase delay film through the lens and the reflecting mirror set, so as to converting the polarization of the reproducing beam, such that the reproducing beam, when projected to the first polarizing splitter, is reflected; and the image sensor is a two-dimensional image sensor disposed on one side of the first polarizing splitter to receive the reproducing beam reflected by the first polarizing splitter.

6. The system for recording and reproducing a holographic interferogram on a holographic storage medium with an optical servo as claimed in claim 5, wherein the servo beam guiding portion comprises:
- a servo beam reflecting mirror set, for reflecting the servo beam to the objective lens to be converged, and then to be projected to the holographic storage medium, wherein the servo beam focuses on the servo track of the holographic storage medium, and is reflected by a wavelength selection film coated on the servo track, and then is projected to the servo sensing portion through the servo beam reflecting mirror set, such that the servo beam is converted to the second electrical signal transmitted to the controlling device, wherein the optical axis of the objective lens is adjusted to be perpendicular to the servo track surface of the holographic storage medium by the controlling device, and the reference beam is adjusted to be projected to the holographic storage medium in the first incidence direction, and the holographic interferogram is continuously recorded in the holographic storage medium along the servo track.

7. The system for recording and reproducing a holographic interferogram on a holographic storage medium with an optical servo as claimed in claim 5, wherein the first light guiding portion further comprises a second objective lens, and the second objective lens includes:
- a first lens; and
- a second lens, with a focus coinciding with a focus of the first lens, and having the focal length shorter than that of the first lens, such that the beam diameter of the reference beam generated by the splitter is further reduced.

8. The system for recording and reproducing a holographic interferogram on a holographic storage medium with an optical servo as claimed in claim 3, wherein the first light guiding portion further comprises:
- a first phase delay film, disposed on one side of the splitter, such that the polarization of the reference beam is converted after being projected to the first phase delay film;
- a reflecting mirror with a third phase delay film adhered to one side of the reflecting mirror, wherein the reference beam passes through the holographic storage medium and is projected to the third phase delay film, and is reflected by the reflecting mirror to pass through the third phase delay film again, such that the polarization of the reference beam is converted, and then the reference beam, after being projected to the splitter, is projected to the reference beam sensing portion, and thus the distance and the incident angle between holographic storage medium and the reference beam is analyzed and adjusted; and the second light guiding portion further comprises:
- a first reflecting mirror, for projecting the signal beam to the spatial light modulator, wherein the signal beam, after the polarization thereof is converted by the spatial light modulator, is reflected by the spatial light modulator;
- a first polarizing splitter, disposed on the path of the signal beam, wherein the signal beam reflected by the spatial light modulator is projected to the first polarizing splitter and a part of the signal beam with the polarization same as the reference beam is reflected by the first polarizing splitter; the signal beam is then projected to the lenses and the reflecting mirror sets to be projected to the holographic storage medium in the second incidence direction, such that the polarization of the signal beam is the same as that of the reference beam, and the signal beam and the reference beam interfere with each other in the holographic storage medium to generate the holographic interferogram in the holographic storage medium;

wherein when the reference beam passing through the first phase delay film is projected to the holographic interferogram, a reproducing beam is generated and travels back along the path of the signal beam, and passes through the first polarizing splitter via the lenses and the reflecting mirror sets; and the image sensor is a two-dimensional image sensor disposed on one side of the first polarizing splitter to receive the reproducing beam reflected by the first polarizing splitter.

9. The system for recording and reproducing a holographic interferogram on a holographic storage medium with an optical servo as claimed in claim 8, wherein the servo beam guiding portion comprises:
- a servo beam reflecting mirror set, for reflecting the servo beam to the objective lens to be converged, and then to be projected to the holographic storage medium, wherein the servo beam passes through a wavelength selection film of the holographic storage medium, and is projected to a servo track of the holographic storage medium, and is reflected by the servo track to the servo sensing portion through the servo beam reflecting mirror set, such that the servo beam is converted to an electrical signal transmitted to the controlling device, wherein the optical axis of the objective lens is adjusted to be perpendicular to the servo track surface of the holographic storage medium by the controlling device, and the reference beam is adjusted to be projected to the holographic storage medium in the first incidence direction, and the holographic interferogram is continuously recorded in the holographic storage medium along the servo track.

10. The system for recording and reproducing a holographic interferogram on a holographic storage medium with an optical servo as claimed in claim 8, wherein the spatial light modulator is a reflective spatial light modulator.

11. The system for recording and reproducing a holographic interferogram on a holographic storage medium with an optical servo as claimed in claim 8, wherein the first light guiding portion further comprises a second objective lens, and the second objective lens includes:
- a first lens; and
- a second lens, with a focus thereof coinciding with a focus of the first lens, and having a focal length shorter than that of the first lens, such that the diameter of the reference beam generated by the splitter is reduced.

12. The system for recording and reproducing a holographic interferogram on a holographic storage medium with an optical servo as claimed in claim 3, wherein the first light guiding portion further comprises:
- a first phase delay film, disposed on one side of the splitter, such that a part of the reference beam is projected to the first phase delay film and the polarization of the reference beam is converted by the first delay film;
- a reflecting mirror with a third phase delay film adhered to one side of the reflecting mirror, wherein the reference beam passes through the holographic storage medium and is projected to the third phase delay film, and is reflected by the reflecting mirror to pass through the third phase delay film again, such that the polarization of the reference beam is converted, and the reference beam, after projected to the splitter, is projected to the reference beam sensing portion, and thus the distance and the incident angle between the reflecting mirror and the reference beam are analyzed and then adjusted by moving reflecting mirror; and the second light guiding portion further comprises:
- a second phase delay film, disposed on the path of the signal beam, wherein the signal beam passes through the second phase delay film and the polarization of the signal beam is converted to the same as that of the reference beam, then the signal beam is projected to the spatial light modulator;
- a first polarizing splitter, wherein the signal beam is reflected by the spatial light modulator to the first polarizing splitter, the signal beam is then reflected by the first polarizing splitter to be projected to the lenses and the reflecting mirror sets, and then is projected to the holographic storage medium in the second incidence direction to interfere with the reference beam, and thus the holographic interferogram is generated in the holographic storage medium;
- wherein when the reference beam passing through the first phase delay film is projected to the holographic interferogram, a reproducing beam is generated and travels back along the path of the signal beam, and passes through the first polarizing splitter through the lenses and the reflecting mirror sets; and
- the image sensor is a two-dimensional image sensor disposed on one side of the first polarizing splitter to receive the reproducing beam passing through the first polarizing splitter.

13. The system for recording and reproducing a holographic interferogram on a holographic storage medium with an optical servo as claimed in claim 12, wherein the servo beam guiding portion comprises:
- a servo beam reflecting mirror set, for reflecting the servo beam to the objective lens to be converged, wherein the servo beam is then projected to a servo track of the holographic storage medium and reflected by a wavelength selection film coated on the servo track to the servo sensing portion through the servo beam reflecting mirror set, such that the servo beam is converted to an electrical signal transmitted to the controlling device, wherein the optical axis of the objective lens is adjusted to be perpendicular to the servo track surface of the holographic storage medium by the controlling device, and the reference beam is adjusted to be projected to the holographic storage medium in the first incidence direction, and the holographic interferogram is continuously recorded in the holographic storage medium along the servo track.

14. The system for recording and reproducing a holographic interferogram on a holographic storage medium with an optical servo as claimed in claim 12, wherein the first light guiding portion further comprises a second objective lens, and the second objective lens includes:
- a first lens; and
- a second lens, with a focus coinciding with the focus of the first lens, and having a focal length thereof shorter than that of the first lens, such that the diameter of the reference beam generated by the splitter is reduced.

15. The system for recording and reproducing a holographic interferogram on a holographic storage medium with an optical servo as claimed in claim 3, wherein
the first light guiding portion comprises a reflecting mirror with a third phase delay film adhered to one side of the reflecting mirror, wherein the reference beam passes through the holographic storage medium and is projected to the third phase delay film, and is reflected by the reflecting mirror to the third phase delay film again, such that the polarization of the reference beam is converted, and the reference beam, after being projected to the splitter, is projected to the reference beam sensing portion, and thus the distance and the incident angle between the reference beam and the holographic storage medium are analyzed and adjusted; and the second light guiding portion further comprises a first polarizing splitter, wherein when the reference beam is projected to the holographic interferogram, a reproducing beam is generated and projected to the second phase delay film through the lenses and the reflecting mirror sets, and the polarization of the reproducing beam is converted, such that the reproducing beam is reflected when the reproducing beam is projected to the first polarizing splitter, wherein the image sensor is a two-dimensional image sensor disposed on one side of the first polarizing splitter to receive the reproducing beam reflected by the first polarizing splitter.

16. The system for recording and reproducing a holographic interferogram on a holographic storage medium with an optical servo as claimed in claim 15, wherein the servo beam guiding portion comprises:
- a servo beam reflecting mirror set, for reflecting the servo beam to the objective lens to be converged, wherein the servo beam is then projected to the servo track of the holographic storage medium and reflected by the wavelength selection film coated on the servo track, and the servo beam is projected to the servo sensing portion through the servo beam reflecting mirror set, such that the servo beam is converted to the second electrical signal transmitted to the controlling device, and thus the optical axis of the objective lens is adjusted to be perpendicular to the servo track surface of the holographic storage medium by the controlling device, and the reference beam is adjusted to be projected to the holographic storage medium in the first incidence direction, and the holographic interferogram is continuously recorded in the holographic storage medium along the servo track.

17. The system for recording and reproducing a holographic interferogram on a holographic storage medium with an optical servo as claimed in claim 15, wherein the first light guiding portion further comprises a second objective lens, and the second objective lens includes:
- a first lens; and
- a second lens, with a focus coinciding with that of the first lens, and a focal length of the second lens shorter than that of the first lens, such that the diameter of the reference beam generated by the splitter is reduced.

18. The system for recording and reproducing a holographic interferogram on a holographic storage medium with an optical servo as claimed in claim 3, wherein the first light guiding portion further comprises:
- a first phase delay film, disposed on one side of the splitter, wherein a part of the reference beam is projected to the first phase delay film and the polarization of the reference beam is changed;
- a reflecting mirror, for making the reference beam pass through the holographic storage medium, and reflect and divert it to return along the original path to be projected to the splitter and then to be diverted to the reference beam sensing portion, such that the distance and the angle of tilt between the reflecting mirror and the reference beam are analyzed and adjusted; and the second light guiding portion further comprises:

a second phase delay film, located on the path of the signal beam, wherein the signal beam is projected to the second phase delay film again after being projected to the spatial light modulator, such that the polarization of the signal beam is converted to be the same as that of a half reference beam, and thus the holographic interferogram is generated when the reference beam and the signal beam interfere with each other in the holographic storage medium;

a first polarizing splitter, located on the path of the signal beam, wherein when the reference beam is projected to the holographic interferogram, a reproducing beam is generated and projected to the second phase delay film through the lenses and the reflecting mirror sets, the polarization of the reproducing beam is converted, such that the reproducing beam, when being projected to the first polarizing splitter, is reflected; and the image sensor is a two-dimensional image sensor disposed on one side of the first polarizing splitter to receive the reproducing beam reflected by the first polarizing splitter.

19. The system for recording and reproducing a holographic interferogram on a holographic storage medium with an optical servo as claimed in claim 18, wherein the servo beam guiding portion comprises:

a servo beam reflecting mirror set, for diverting the servo beam so as to make the servo beam to be a convergent light beam projected to the holographic storage medium via the objective lens, wherein the servo beam is then projected to the servo track of the holographic storage medium and reflected by the wavelength selection film coated on the servo track, and the servo beam is then projected to the servo sensing portion through the servo beam reflecting mirror set, such that the servo beam is converted to the second electrical signal transmitted to the controlling device, and thus the optical axis of the objective lens is adjusted to be perpendicular to the servo track surface of the holographic storage medium by the controlling device, and the reference beam is adjusted to be projected to the holographic storage medium in the first incidence direction, and the holographic interferogram is continuously recorded in the holographic storage medium along the servo track.

20. The system for recording and reproducing a holographic interferogram on a holographic storage medium with an optical servo as claimed in claim 18, wherein the first light guiding portion further comprises a second objective lens, and the second objective lens includes:

a first lens; and a second lens, with a focus coinciding with that of the first lens, and a focal length shorter than that of the first lens, such that the diameter of the reference beam generated by the splitter is reduced.

21. The system for recording and reproducing a holographic interferogram on a holographic storage medium with an optical servo as claimed in claim 2, wherein the first light guiding portion comprises:

a third splitter, for splitting the light generated by the light source into the signal beam and the reference beam with the directions of polarization perpendicular to each other, wherein the reference beam is projected to the holographic storage medium in the first incidence direction; and the second light guiding portion comprises:

a third phase delay film, disposed on the path of the signal beam, wherein the polarization of the signal beam is converted to be the same as that of the reference beam, and the signal beam is projected to the spatial light modulator;

one or more lenses and one or more reflecting mirror sets, for changing the direction of the signal beam after the signal beam is projected to the spatial light modulator, such that the signal beam is projected to the holographic storage medium in the second incidence direction and interferes with the reference beam.

22. The system for recording and reproducing a holographic interferogram on a holographic storage medium with an optical servo as claimed in claim 21, wherein the first light guiding portion further comprises:

a first phase delay film, disposed on one side of the third polarizing splitter, such that the polarization of the reference beam projected to the first phase delay film is converted; and the second light guiding portion further comprises:

a second phase delay film, located on the path of the signal beam, wherein the signal beam is projected to the second phase delay film again after being projected to the spatial light modulator, such that the polarization of the signal beam is converted to be the same as that of the reference beam, and thus the holographic interferogram is generated when the reference beam and the signal beam interfere with each other in the holographic storage medium;

a first polarizing splitter, located on the path of the signal beam, wherein when a part of the reference beam is projected to the holographic interferogram, a reproducing beam is generated and projected to the second phase delay film through the lenses and the reflecting mirror, and the polarization of the part of the reference beam is converted, such that the reproducing beam is reflected when the reproducing beam is projected to the first polarizing splitter; and the image sensor is a two-dimensional image sensor disposed on one side of the first polarizing splitter to receive the reproducing beam reflected by the first polarizing splitter.

23. The system for recording and reproducing a holographic interferogram on a holographic storage medium with an optical servo as claimed in claim 22, wherein the servo beam guiding portion comprises:

a reflecting mirror with a fourth phase delay film adhered to one side of the reflecting mirror, wherein the reference beam passes through the holographic storage medium and is projected to the fourth phase delay film, and is then reflected by the reflecting mirror to pass through the fourth phase delay film again, such that the polarization of the reference beam is converted, and the reference beam is projected to the reference beam sensing portion after being projected to the splitter, and thus the distance and the incident angle between the reference beam and the reflecting mirror are analyzed and then adjusted by moving the reflecting mirror; and a servo beam reflecting mirror set, for reflecting the servo beam to the objective lens to be converged and then projected to the holographic storage medium, wherein the servo beam is projected to a servo track of the holographic storage medium and reflected by a wavelength selection film coated on the servo track, and the servo beam is projected to the servo sensing portion through the servo beam reflecting mirror set, such that the servo beam is converted to an electrical signal, which is transmitted to the controlling device, thus the optical axis of the objective lens is adjusted to be perpendicular to the servo track surface of the holographic storage medium by the controlling device, and the reference beam is adjusted to be projected to the holographic storage medium in the first incidence direction, and the holographic interferogram is continuously recorded in the holographic storage medium along the servo track.

24. The system for recording and reproducing a holographic interferogram on a holographic storage medium with an optical servo as claimed in claim 22, wherein the first light guiding portion further comprises a second objective lens, and the second objective lens includes:
   a first lens; and
   a second lens with a focus coinciding with the focus of the first lens, and a focal length of the second lens shorter than that of the first lens, such that the diameter of the reference beam generated by the splitter is reduced.

25. The system for recording and reproducing a holographic interferogram on a holographic storage medium with an optical servo as claimed in claim 22, wherein the first light guiding portion further comprises an objective lens for converging the reference beam to be projected to the holographic storage medium.

26. The system for recording and reproducing a holographic interferogram on a holographic storage medium with an optical servo as claimed in claim 25, wherein the first light guiding portion further comprises a second objective lens, and the second objective lens includes:
   a first lens with a focus coinciding with that of the objective lens, such that the diameter of the reference beam generated, by the splitter is reduced and the reference beam is a parallel light.

\* \* \* \* \*